US012609729B2

(12) United States Patent
Cho

(10) Patent No.: US 12,609,729 B2
(45) Date of Patent: Apr. 21, 2026

(54) ELECTRONIC DEVICE AND METHOD FOR TRANSMITTING UWB SIGNAL IN ELECTRONIC DEVICE

(71) Applicant: SAMSUNG ELECTRONICS CO., LTD., Suwon-si (KR)

(72) Inventor: Namjun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/625,962

(22) Filed: Apr. 3, 2024

(65) Prior Publication Data

US 2024/0267080 A1 Aug. 8, 2024

Related U.S. Application Data

(63) Continuation of application No. 17/940,757, filed on Sep. 8, 2022, now Pat. No. 11,956,007, which is a
(Continued)

(30) Foreign Application Priority Data

Sep. 8, 2021 (KR) ........................ 10-2021-0119725

(51) Int. Cl.
*H04B 1/69* (2011.01)
(52) U.S. Cl.
CPC ...................................... *H04B 1/69* (2013.01)
(58) Field of Classification Search
CPC .... H04B 7/0695; H04B 7/0617; H04B 7/088; H04B 7/0408; H04B 7/0413;
(Continued)

(56) References Cited

U.S. PATENT DOCUMENTS

| 8,811,527 B2 | 8/2014 | Diao et al. |
| 8,879,983 B2 | 11/2014 | Yun et al. |
| | (Continued) | |

FOREIGN PATENT DOCUMENTS

| CN | 110995290 A | 4/2020 |
| CN | 112350053 A | 2/2021 |
| | (Continued) | |

OTHER PUBLICATIONS

International Search Report (PCT/ISA/210), dated Dec. 13, 2022, issued by the International Searching Authority, Application No. PCT/KR2022/013504.
(Continued)

*Primary Examiner* — Eva Y Puente
(74) *Attorney, Agent, or Firm* — Sughrue Mion, PLLC

(57) ABSTRACT

According to various embodiments, an electronic device may comprise a communication processor; an intermediate frequency integrated circuit (IFIC) to convert a baseband signal received from the communication processor into an intermediate frequency (IF) signal; a radio frequency integrated circuit (RFIC) convert the received IF signal into a first radio frequency (RF) signal; an ultra-wideband (UWB) integrated circuit (IC) generating a UWB signal corresponding to a first frequency; at least one UWB antenna to transmit/receive the UWB signal corresponding to the first frequency; and at least one first switch connected between the UWB IC and the UWB antenna. The at least one first switch may be controlled so that the UWB signal corresponding to the first frequency, generated by the UWB IC, is transmitted to the RFIC in a state in which a communication operation, for a signal transmitted/received from the communication processor, by the RFIC is inactivated.

21 Claims, 18 Drawing Sheets

Related U.S. Application Data continuation of application No. PCT/KR2022/013504, filed on Sep. 8, 2022.

(58) Field of Classification Search

CPC .. H04B 7/0626; H04B 7/0639; H04B 17/318; H04W 16/28; H04W 72/046; H04W 72/23; H04W 24/10; H04W 74/0833; H04W 84/18; H04W 72/542; H04W 88/08; H04L 5/0048; H04L 5/0053; H04L 5/0023; H04L 5/0051; H04L 5/0092; H04L 5/0094; H04L 27/2613; H04L 5/001

See application file for complete search history.

(56) References Cited

U.S. PATENT DOCUMENTS

| | | | |
|---|---|---|---|
| 9,401,732 | B2 | 7/2016 | He et al. |
| 11,416,077 | B2 * | 8/2022 | Baheti ..................... G01S 13/06 |
| 11,469,526 | B2 * | 10/2022 | Ma ........................... H01Q 3/24 |
| 11,790,188 | B2 | 10/2023 | Cheng et al. |
| 2006/0187111 | A1 | 8/2006 | Uchino |
| 2010/0297958 | A1 | 11/2010 | Murakami et al. |
| 2019/0227156 | A1 * | 7/2019 | Santra ..................... G01S 13/42 |
| 2020/0176887 | A1 | 6/2020 | Lee et al. |
| 2020/0194904 | A1 * | 6/2020 | Huh .................... H01Q 21/065 |
| 2020/0300996 | A1 * | 9/2020 | Cetinoneri .............. G01S 7/024 |
| 2020/0400777 | A1 | 12/2020 | Lentsch et al. |
| 2020/0411986 | A1 | 12/2020 | Cooper et al. |

| | | | |
|---|---|---|---|
| 2021/0011147 | A1 * | 1/2021 | Va ........................... G01S 7/415 |
| 2021/0028540 | A1 | 1/2021 | Rom et al. |
| 2021/0144729 | A1 | 5/2021 | Kim et al. |
| 2022/0094078 | A1 | 3/2022 | Ma et al. |
| 2022/0131560 | A1 * | 4/2022 | Zhang .................. H04B 1/0057 |
| 2022/0286980 | A1 * | 9/2022 | Lee .......................... H04B 1/40 |
| 2025/0118893 | A1 * | 4/2025 | Seo .......................... H05K 7/20 |

FOREIGN PATENT DOCUMENTS

| | | | |
|---|---|---|---|
| JP | 2010-272900 | A | 12/2010 |
| KR | 10-2005-0065861 | A | 6/2005 |
| KR | 10-2020-0067610 | A | 6/2020 |
| KR | 10-2021-001976 | A | 1/2021 |
| KR | 10-2021-0058077 | A | 5/2021 |
| WO | 2020/149434 | A1 | 7/2020 |
| WO | 2021/100925 | A1 | 5/2021 |

OTHER PUBLICATIONS

Written Opinion (PCT/ISA/237), dated Dec. 13, 2022, issued by the International Searching Authority, Application No. PCT/KR2022/013504.

Communication issued on Sep. 24, 2024 by the European Patent Office for European Patent Application No. 22867719.1.

Office Action issued on Oct. 22, 2025 issued by the Korean Patent Office in Korean Patent Application No. 10-2021-0119725.

Communication issued on Mar. 2, 2026 issued by the Government of India in India Patent Application No. 202417025126.

* cited by examiner

ELECTRONIC DEVICE AND METHOD FOR TRANSMITTING UWB SIGNAL IN ELECTRONIC DEVICE

CROSS-REFERENCE TO RELATED APPLICATIONS

This application is a Continuation Application of U.S. application Ser. No. 17/940,757, filed on Sep. 8, 2022, which is a Continuation Application of International Application No. PCT/KR2022/013504, filed on Sep. 8, 2022, which claims priority to Korean Patent Application No. 10-2021-0119725, filed Sep. 8, 2021, the disclosures of which are incorporated by reference herein their entireties.

BACKGROUND

1. Technical Field

The disclosure relates to an electronic device and a method for transmitting an ultra-wideband (UWB) signal in the electronic device.

2. Description of Related Art

As mobile communication technology evolves, multi-functional portable terminals are commonplace and, to meet increasing demand for radio traffic, vigorous efforts are underway to develop next-generation communication systems. To achieve a higher data transmission rate, next-generation communication systems, such as 5G communication systems, are being implemented on higher frequency bands (e.g., an mmWave band) as well as those used for 3G communication systems and long-term evolution (LTE) communication systems. Modules providing various functions are mounted in a portable terminal (e.g., a smartphone).

Ultra-wideband (UWB) communication technology (hereinafter, 'UWB' or 'UWB technology') is a communication technology for transmitting signals using very short pulses (e.g., several nanoseconds) with low power over a wide band.

As an example, impulse-radio ultra-wideband (IR-UWB) may transmit/receive (i.e., transceive) very short pulses in a wide frequency band and precisely measure the time of arrival (TOA) or time of flight (TOF), which is the time at which the pulse reaches the target, providing precise distance and position recognition technology with an error of tens of centimeters indoors or outdoors. IR-UWB has a very low spectral power density in a wide frequency band, has excellent transmittance to buildings, walls, or partitions, is capable of communication with relatively low power, and is robust against the influence of multiple paths.

UWB is attracting attention as a technology capable of precise positioning and tracking that may become a basis for future Internet of things (IoT) society or ubiquitous technology environment and has applications in various sectors, such as indoor/outdoor positioning, indoor navigation, asset tracking, disaster-related industrial robots, home and building automation (e.g., lighting and air conditioner wind direction control), vehicle and home smart key services, unmanned payment systems, or automatic notification functions for nearby convenience facilities or stores of interest. Services or technologies using UWB may be applied not only to the above-described examples but also to other various services or technologies.

SUMMARY

UWB may decode time stamp information included in packets exchanged while performing bi-directional communication with an access point to predict a position. As another example, in the absence of an access point, a circumstantial recognition function may be implemented based on a radar technology using UWB signals.

In a radar technology using UWB signals, to secure a desired radar sensing distance, sufficient isolation between the transmit antenna and the receive antenna should be secured. As electronic devices (e.g., smartphones) are downsized and come with more built-in components or functions, it may be hard to secure isolation between the antennas for UWB technology. Further, to ensure accuracy in measurement through radar technology, the signal straightness should be secured. However, the straightness is lower in the signals in the UWB communication frequency band (e.g., 3 to 10 GHz) than the signals in the millimeter wave (mmWave) frequency band (e.g., 20 to 300 GHz). Thus, the accuracy may be relatively low. Further, it may be difficult to secure desired performance because it is not easy to design a UWB antenna mounted in an electronic device considering directivity. It may also be difficult to implement various sensing functions, such as motion detection or gesture detection, using radar technology with a small number of UWB antennas.

According to various embodiments, there may be provided an electronic device and a method for transmitting a UWB signal in the electronic device, which may increase the performance of UWB by up-converting the UWB signal generated from a UWB integrated circuit (IC) into an mmWave frequency band signal through an mmWave module included in the electronic device while the mmWave module is not used for wireless communication and transmitting the mmWave frequency band signal.

According to any one of various embodiments, an electronic device may comprise a communication processor; an intermediate frequency integrated circuit (IFIC) connected with the communication processor and configured to convert a baseband signal received from the communication processor into an intermediate frequency (IF) signal; a radio frequency integrated circuit (RFIC) connected with the IFIC and configured to receive the IF signal and convert the received IF signal into a first radio frequency (RF) signal; an ultra-wideband (UWB) integrated circuit (IC) generating a UWB signal corresponding to a first frequency; at least one UWB antenna connected with the UWB IC configured to transmit/receive the UWB signal corresponding to the first frequency; and at least one first switch connected between the UWB IC and the UWB antenna. The at least one first switch may be controlled so that the UWB signal corresponding to the first frequency, generated by the UWB IC, is configured to be transmitted to the RFIC in a state in which a communication operation, for a signal transmitted/received from the communication processor, by the RFIC is inactivated.

According to any one of various embodiments, an electronic device may comprise a first communication processor generating a baseband signal; an IFIC connected with the communication processor configured to convert the baseband signal received from the communication processor into a first IF signal; an RFIC connected with the IFIC configured to receive the first IF signal and convert the received first IF signal into an RF signal; a first antenna configured to transmit the RF signal output from the RFIC; a second communication processor configured to generate a second IF signal; a second antenna connected with the second communication processor configured to transmit the second IF signal; and at least one switch connected between the second communication processor and the second antenna. The at least one switch may configure to be controlled so that the second IF signal generated by the second communication processor is configured to be transmitted to the RFIC in a state in which a communication operation, for a signal transmitted/received from the first communication processor, by the RFIC is inactivated.

According to any one of various embodiments, a method for operating an electronic device may comprise receiving a baseband signal generated from a communication processor and converting the baseband signal into an IF signal, by an IFIC; receiving the IF signal and converting the IF signal into a first RF signal, by an RFIC; transmitting the first RF signal through a first antenna; generating a UWB signal corresponding to a first frequency by a UWB IC; transmitting the UWB signal corresponding to the first frequency through a second antenna; identifying that a communication operation, for a signal transmitted/received from the communication processor, by the RFIC is in an inactive state; transmitting the UWB signal to the RFIC, in response to identifying that the communication operation for the signal transmitted/received from the communication processor is in the inactive state; converting the UWB signal into a second RF signal by the RFIC; and transmitting the second RF signal through the first antenna.

According to various embodiments, it is possible to secure isolation between the transmit antenna and the receive antenna by up-converting the UWB signal generated from the UWB IC into an mmWave frequency band signal through the mmWave module, included in the electronic device for communication, while the mmWave module is not used and transmitting it.

According to various embodiments, it is possible to secure signal straightness and thus increasing sensing accuracy by up-converting the UWB signal generated from the UWB IC into an mmWave frequency band signal, which is a relatively high frequency band, through the mmWave module included in the electronic device for communication, while the mmWave module is not used and transmitting it.

According to various embodiments, it is possible to implement various sensing, such as motion detection or gesture detection, using radar technology by up-converting the UWB signal generated from the UWB IC into an mmWave frequency band signal through the mmWave module, included in the electronic device for communication, while the mmWave module is not used and transmitting UWB signals through multiple array antennas in the mmWave module.

DETAILED DESCRIPTION

Figure 1:
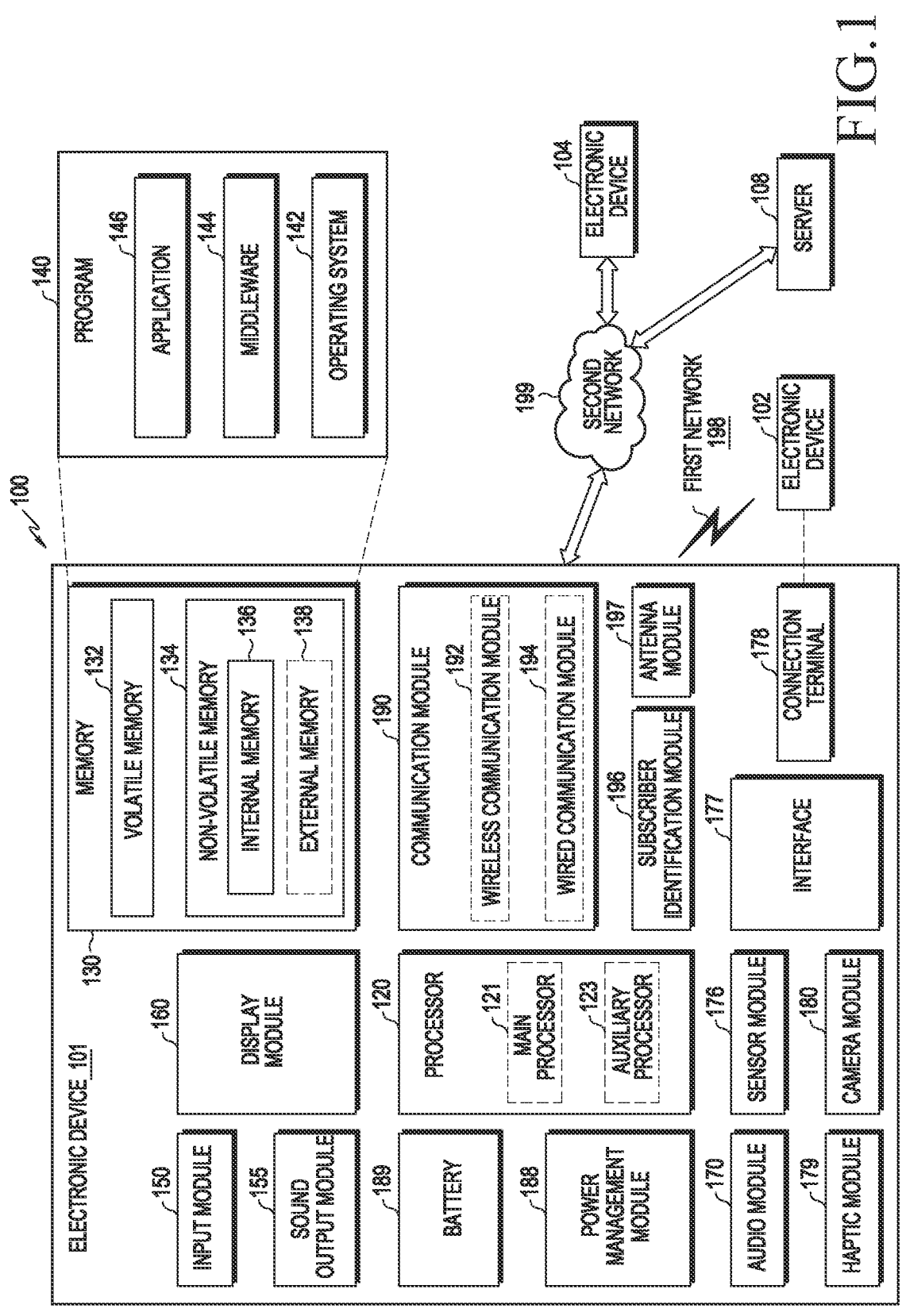
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, 12C, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
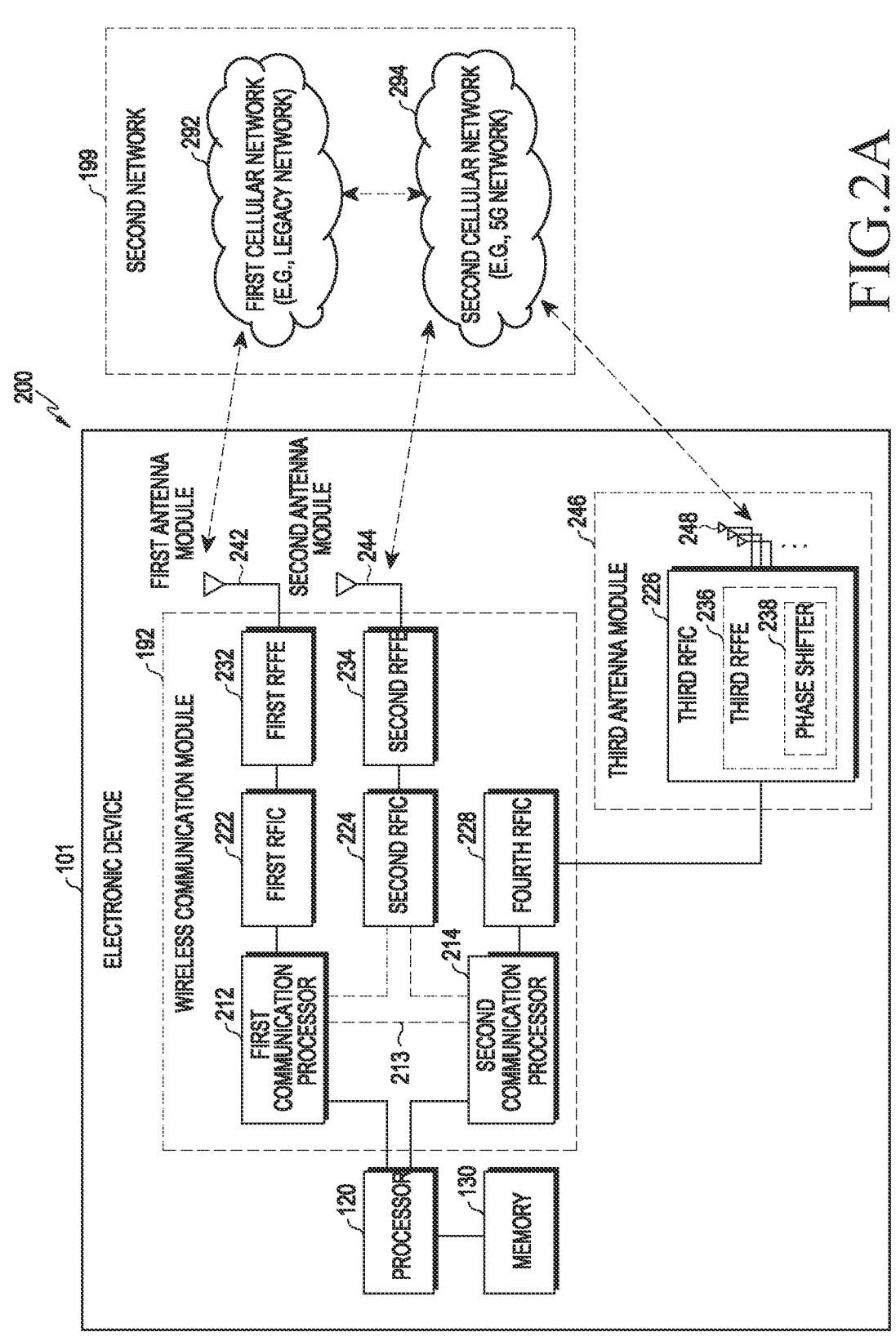
FIG. 2A is a block diagram illustrating an electronic device in a network environment including a plurality of cellular networks according to various embodiments.

FIG. 2A is a block diagram 200 of an electronic device 101 in a network environment including a plurality of cellular networks according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. According to an embodiment, the first communication processor 212 and the second communication processor 214 may be connected together directly or indirectly by an interface (not shown) to provide or receive data or control signals unilaterally or bi-laterally.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
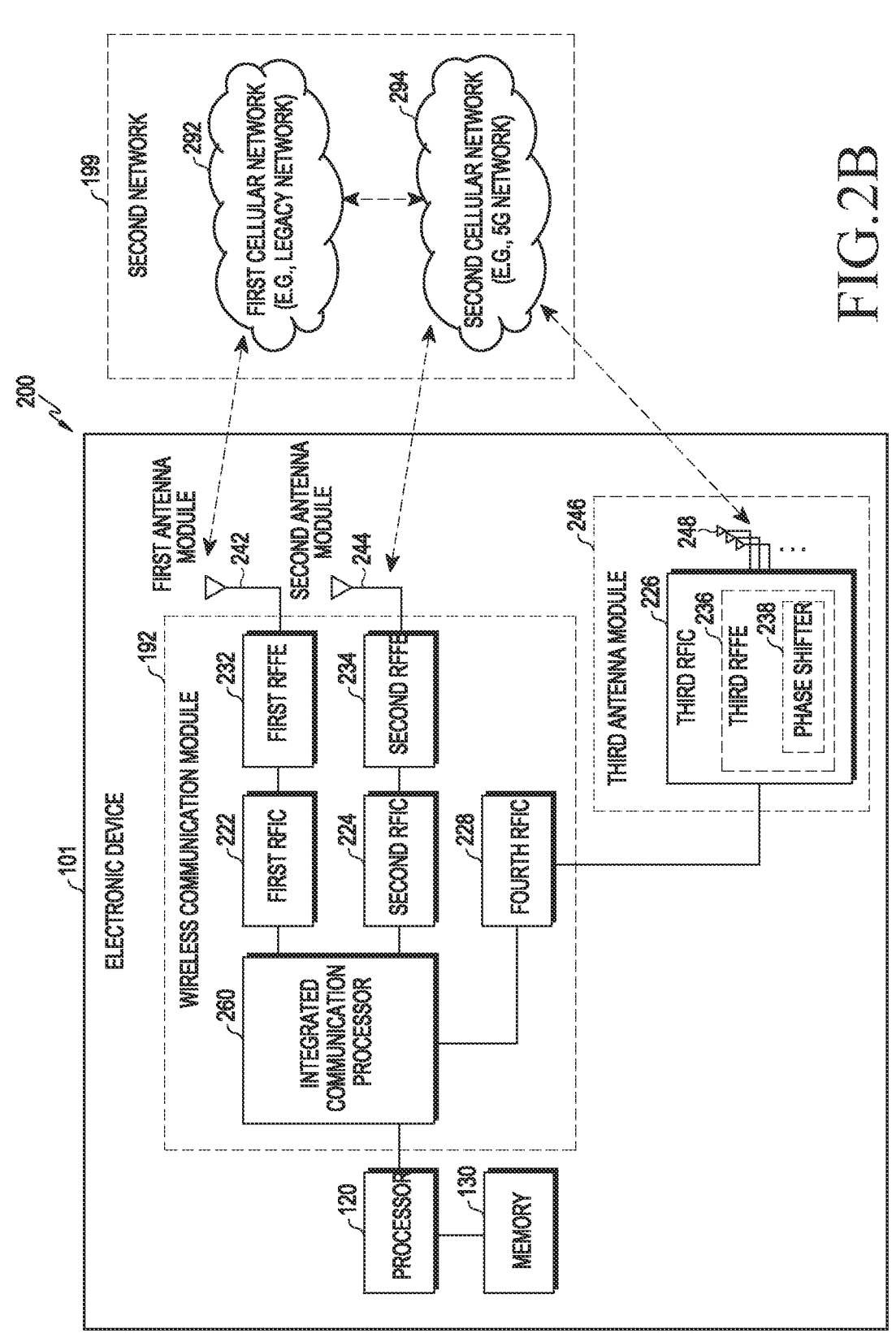
FIG. 2B is a block diagram illustrating an electronic device in a network environment including a plurality of cellular networks according to various embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHZ) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHZ) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
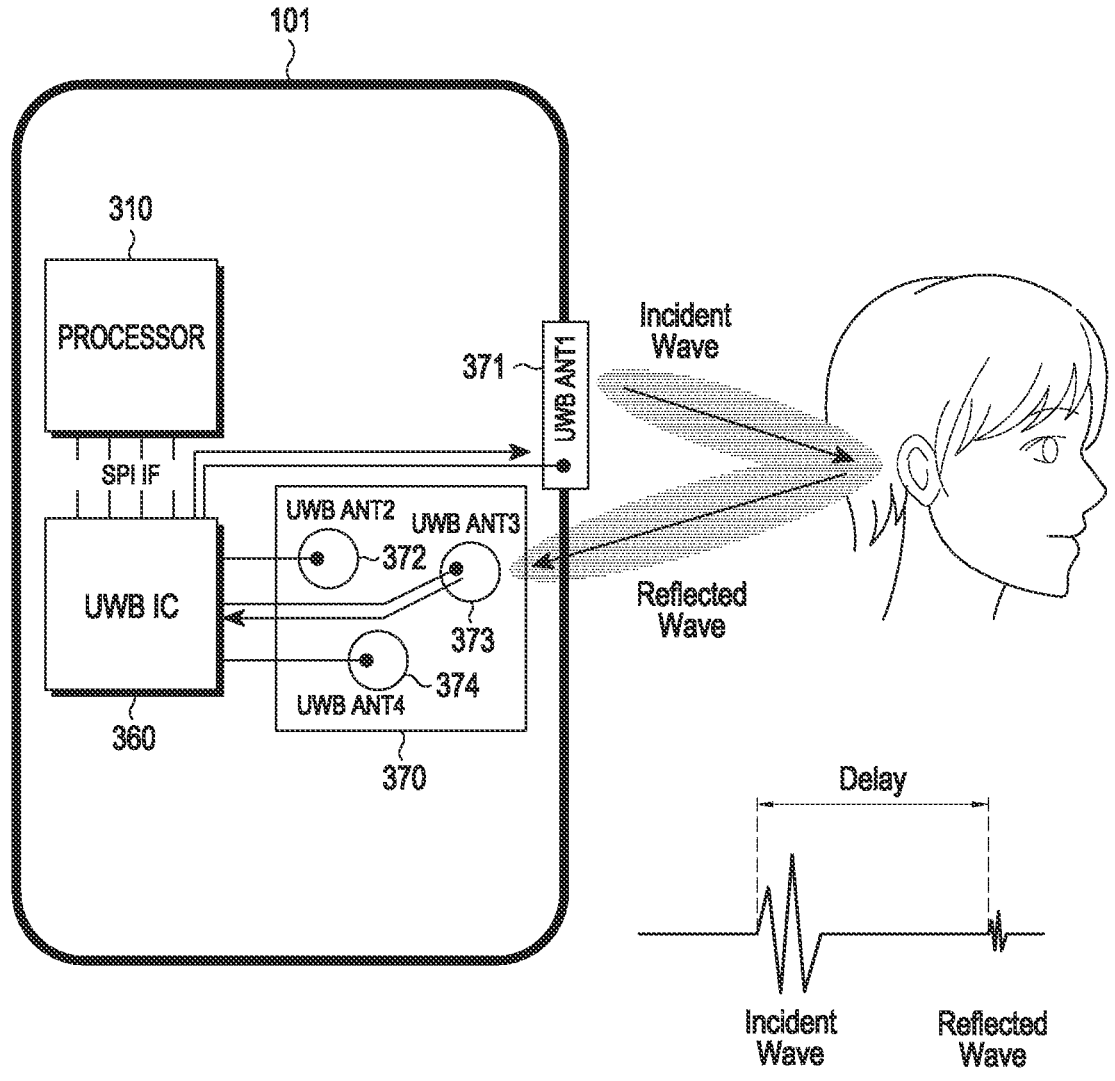
FIG. 3 is a block diagram illustrating an electronic device supporting UWB technology according to various embodiments.
Figure 4:
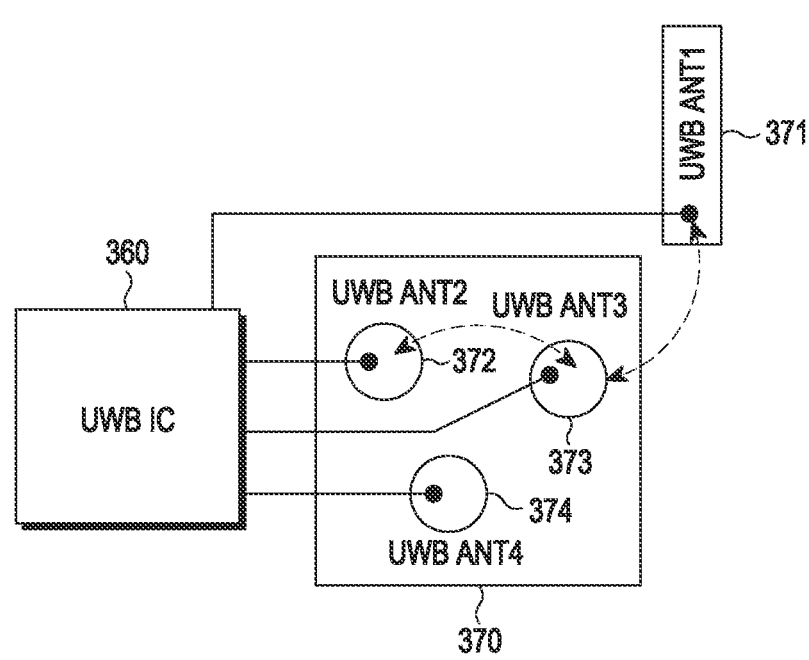
FIG. 4 is a view illustrating an arrangement of UWB antennas according to various embodiments.

FIGS. 3 and 4 are block diagrams illustrating an electronic device supporting UWB technology according to various embodiments. Referring to FIG. 3, according to various embodiments, an electronic device 101 may include a processor 310, a UWB integrated circuit (UWB IC) 360, or a UWB antenna 370. For example, the UWB antenna 370 may include a plurality of antennas and may include at least one transmit antenna and at least one receive antenna. Although FIG. 3 illustrates that the UWB antenna 370 includes four antennas, and one transmit antenna 371 (e.g., a first UWB antenna 371) and three receive antennas (e.g., a second UWB antennas 372, a third UWB antenna 373, and a fourth UWB antenna 374) are included, the transmit antennas or receive antennas are not limited to the numbers. According to various embodiments, the transmit antenna 371 may be used as a receive antenna, and at least one of the three receive antennas 372, 373, and 374 may be used as a transmit antenna.

According to various embodiments, the processor 310 may transmit a control signal or a control command for transmitting/receiving a UWB signal to the UWB IC 360 according to an operation for an application requiring a sensing function using the UWB signal. For example, the processor 310 may transmit a control signal or a control command to the UWB IC 360 to recognize the distance from an object, the movement of the object, or the user's gesture. The processor 310 and the UWB IC may be connected to each other through a bus, I2C, general purpose input and output (GPIO), serial circumstantial interface (SPI), or mobile industry processor interface (MIPI) to exchange signals (e.g., commands or data), but the communication scheme is not limited thereto.

According to various embodiments, the UWB IC 360 may generate a UWB signal based on a control command or a control signal of the processor 310. According to various embodiments, the UWB signal may be a signal (e.g., 3 to 10 GHz signal) having a center frequency and a bandwidth set for each channel based on a UWB standard (e.g., IEEE 802.15.4 or IEEE 802.15.6), but is not limited thereto. The UWB signal may be a signal in the form of a pulse but its form and period are not limited to specific ones. For example, the UWB signal may be generated as a signal corresponding to Table 1 below for each channel according to the UWB standard.

TABLE 1

| Band group | Channel number | Central frequency (MHz) | Bandwidth (MHz) | Channel attribute |
|---|---|---|---|---|
| Low band | 1 | 3494.4 | 499.2 | Optional |
| | 2 | 3993.6 | 499.2 | Mandatory |
| | 3 | 4492.8 | 499.2 | Optional |
| High band | 4 | 6489.6 | 499.2 | Optional |
| | 5 | 6988.8 | 499.2 | Optional |
| | 6 | 7488.0 | 499.2 | Optional |
| | 7 | 7987.2 | 499.2 | Mandatory |
| | 8 | 8486.4 | 499.2 | Optional |
| | 9 | 8985.6 | 499.2 | Optional |
| | 10 | 9484.8 | 499.2 | Optional |
| | 11 | 9984.0 | 499.2 | Optional |

According to various embodiments, the UWB IC 360 may transmit the generated UWB signal through the UWB antenna 370. The UWB signal wirelessly transmitted through the transmit antenna of the UWB antenna 370 may be reflected through an object and then received through the receive antenna of the UWB antenna 370. The UWB signal received through the UWB antenna 370 may be transmitted to the UWB IC 360. The UWB IC 360 may identify the distance from the object, movement of the object, or the user's gesture, based on the UWB signal transmitted through the transmit antenna of the UWB antenna 370 and the UWB signal received through the receive antenna of the UWB antenna 370. For example, the UWB IC 360 may transmit the generated UWB signal through the first UWB antenna 371. The signal (e.g., an incident wave) transmitted through the first UWB antenna 371 may be reflected by an object (e.g., a person's body or head) and received through other UWB antennas (e.g., the second UWB antenna 372, the third UWB antenna 373, and the fourth UWB antenna 374) as illustrated in FIG. 3. The electronic device 101 (e.g., the processor 310 or the UWB IC 360 of the electronic device 101) may identify the distance from, or movement of, the object from the signal (e.g., the reflected wave) received through at least one of the second UWB antenna 372, the third UWB antenna 373, or the fourth UWB antenna 374. For example, the electronic device 101 may identify the distance from, or movement of, the object using a delay time (or time difference) between the incident wave and the reflected wave.

In order for the radar technology using UWB signals to obtain a radar sensing distance, sufficient isolation should be secured between the transmit antenna (e.g., the first antenna 371) and the receive antenna (e.g., the second UWB antenna 372, the third UWB antenna 373, or the fourth UWB antenna 374). As the electronic device 101 is downsized and comes with more built-in components or functions, it may be hard to secure isolation between the antennas for UWB technology as illustrated in FIG. 4. For example, referring to FIG. 4, as the first UWB antenna 371 and the third UWB antenna 373 are disposed adjacent to each other, and the second UWB antenna 372 and the third UWB antenna 373 are disposed adjacent to each other, the coupling between the antennas increases, which may degrade performance. Further, to ensure accuracy in measurement through radar technology, the signal straightness should be secured. However, the straightness is lower in the signals in the UWB communication frequency band (e.g., 3 to 10 GHZ) than the signals in the millimeter wave (mmWave) frequency band (e.g., 20 to 300 GHZ). Thus, the accuracy may be relatively low. Further, it may be difficult to secure desired performance because it is not easy to design a UWB antenna mounted in an electronic device considering directivity as illustrated in FIG. 3. It may also be difficult to implement various sensing functions, such as motion detection or gesture detection, using radar technology with a relatively small number of UWB antennas (e.g., four UWB antennas).

Described below are various embodiments which may increase the performance of UWB by up-converting the UWB signal generated from a UWB IC into an mmWave frequency band signal through an mmWave module included in the electronic device while the mmWave module is not used for wireless communication, and transmitting the mm Wave frequency band signal.

Figure 5:
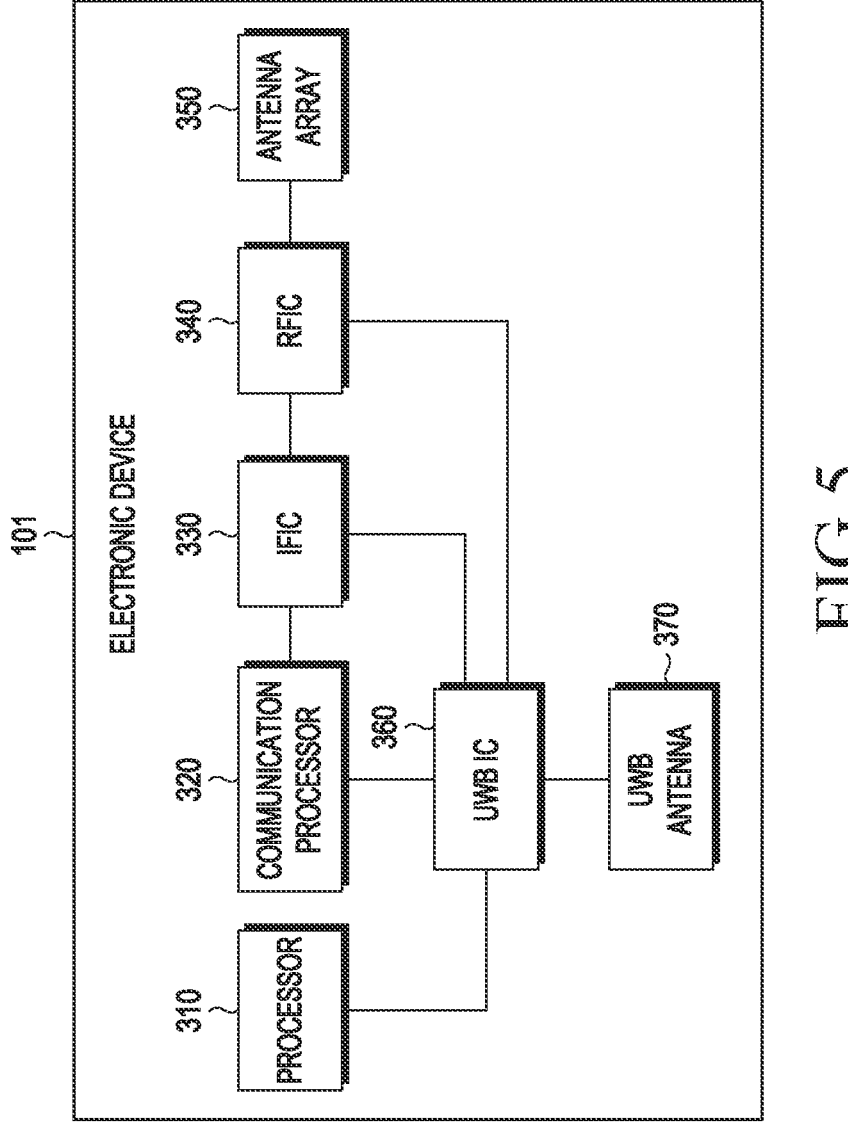
FIG. 5 is a block diagram illustrating an electronic device according to various embodiments.
Figure 12:
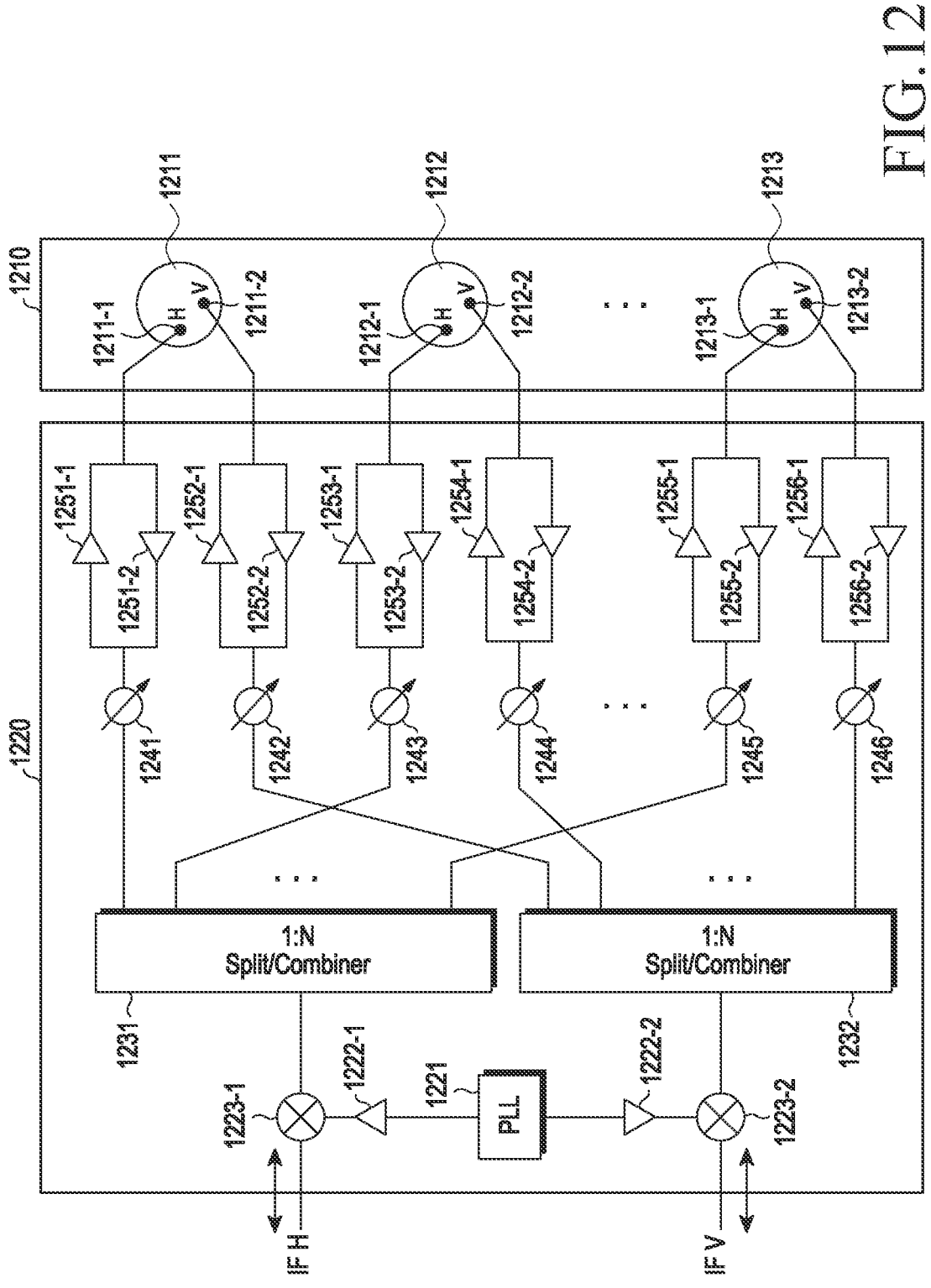
FIG. 12 illustrates a structure of an RFIC and an antenna module according to various embodiments.

FIG. 5 is a block diagram illustrating an electronic device according to various embodiments. Referring to FIG. 5, an electronic device 101 may include a processor 310, a communication processor 320, an IFIC 330, an RFIC 340, an antenna array 350, a UWB IC 360, and a UWB antenna 370. According to various embodiments, the RFIC 340 and the antenna array 350 may be included in at least one antenna module. For example, the electronic device 101 may be configured so that as illustrated in FIG. 12, the RFIC 340 and the antenna array 350 are included in at least one mmWave module and are configured to convert the intermediate frequency (IF) signal received by the RFIC 340 into an RF signal corresponding to an mmWave (e.g., 20 to 300 GHz).

According to various embodiments, the processor 310 may be the processor 120 of FIG. 1 and may be referred to as, e.g., an application processor (AP). According to various embodiments, the communication processor 320 may be the second communication processor 214 of FIG. 2A or the integrated communication processor 260 of FIG. 2B and may be referred to as a communication processor (CP). According to various embodiments, the IFIC 330 may be the fourth RFIC 228 of FIG. 2A or 2B. According to various embodiments, the RFIC 340 may be the third RFIC 226 of FIG. 2A or 2B. According to various embodiments, the antenna array 350 may be the antenna 248 of FIG. 2A or 2B. According to various embodiments, the antenna array 350 may include a plurality of antenna elements.

According to various embodiments, the communication processor 320 may generate a baseband signal based on a control signal from the processor 310. The baseband signal generated by the communication processor 320 may be transferred to the IFIC 330. The IFIC 330 may generate a signal in an intermediate frequency (IF) band (an IF signal) based on the baseband signal received from the communication processor 320 and may transfer the generated IF signal to RFIC 340.

According to various embodiments, the IF signal transferred from the IFIC 330 to the RFIC 340 may include at least one of a first IF signal corresponding to at least one antenna (e.g., a V-pol antenna) radiating a first polarization characteristic signal and a second IF signal corresponding to at least one antenna (e.g., an H-pol antenna) radiating a second polarization characteristic signal. According to various embodiments, an interface (e.g., a port) for transferring the first IF signal and an interface (e.g., a port) for transferring the second IF signal may be separately disposed between the IFIC 330 and the RFIC 340.

According to various embodiments, the first IF signal output from the IFIC 330 may be converted into an RF signal through the RFIC 340, and the RF signal may be radiated as a signal having a first polarization characteristic through at least one V-pol antenna of the antenna array 350. The second IF signal output from the IFIC 330 may be converted into an RF signal through the RFIC 340, and the RF signal may be radiated as a signal having a second polarization characteristic through at least one H-pol antenna of the antenna array 350.

According to various embodiments, having the first polarization characteristic may indicate an electric field polarized in a direction perpendicular to the ground, and having the second polarization characteristic may indicate an electric field polarized in a direction horizontal to the ground, but embodiments of the disclosure are not limited thereto.

According to various embodiments, as described above, the RFIC 340 (e.g., the third RFIC 226 of FIG. 2A) and the antenna array 350 (e.g., the antenna 248 of FIG. 2A) may be disposed on the same substrate and configured as one module (e.g., an mmWave module (e.g., the third antenna module 246 of FIG. 2A)).

According to various embodiments, the UWB IC 360 may generate a UWB signal based on a control signal of the processor 310. According to various embodiments, the UWB signal may correspond to a signal (e.g., 3 to 10 GHz signal) having a center frequency and a bandwidth set for each channel based on a UWB standard (e.g., IEEE 802.15.4 or IEEE 802.15.6), but is not limited thereto. For example, the UWB signal may be generated as a signal corresponding to Table 1 described above according to the UWB standard.

According to various embodiments, the UWB IC 360 may transmit the generated UWB signal through the transmit antenna of the UWB antenna 370. The UWB signal wirelessly transmitted through the UWB antenna 370 may be reflected through an object and then received through the receive antenna of the UWB antenna 370. The UWB signal received through the UWB antenna 370 may be transmitted to the UWB IC 360. As described above in connection with FIG. 3, the UWB IC 360 may identify the distance from, or movement of, the object, based on the UWB signal transmitted through the transmit antenna of the UWB antenna 370 and the UWB signal received through the receive antenna of the UWB antenna 370.

According to various embodiments, the communication processor 320 may configured to transmit/receive wireless communication signals (e.g., 3G communication signals, LTE communication signals, or 5G communication signals) through the IFIC 330, the RFIC 340, and the antenna array 350. In the following description, to distinguish from the UWB signal, the signal generated by the communication processor 320 and transmitted through the IFIC 330, the RFIC 340, and the antenna array 350 is referred to as a 'wireless communication signal' for convenience. According to various embodiments, the UWB IC 360 may transmit/receive the UWB signal through the RFIC 340 and the antenna array 350 during a time period when the communication processor 320 does not perform wireless communication through the RFIC 340 and the antenna array 350 (e.g., during a time period when no wireless communication signal is transmitted/received). For example, the UWB IC 360 may transmit the UWB signal to the RFIC 340 directly or through the IFIC 330 in the time period during which the communication processor 320 does not perform wireless communication through the RFIC 340 and the antenna array 350. The RFIC 340 may receive the UWB signal in an IF frequency band from the UWB IC 360 and convert the received UWB signal into an RF signal. For example, the UWB signal may be an IF signal in a 3 to 10 GHz band, and the RFIC 340 may convert the IF band UWB signal received from the UWB IC 360 into an RF signal. In the following description, conversion by the RFIC 340 from the IF signal to an RF signal in a higher frequency band is referred to as up-conversion for convenience. According to various embodiments, the IF signal generated by the communication processor 320 and converted through the IFIC 330, and the IF signal generated by the UWB IC 360 may have at least one same frequency band or may have a different frequency band therefrom. For example, the IF signal converted from the baseband signal received from the communication processor 320 through the IFIC 330 may be 6 GHz to 11 GHz, and the IF signal generated from the UWB IC 360 may be 3 GHz to 10 GHZ. According to various embodiments, the IF signal of 6 GHz to 11 GHz, converted through the IFIC 330, may be up-converted into a first RF signal (e.g., an RF signal of 28 GHz) by the RFIC 340, and the IF signal of 3 GHz to 10 GHz, generated by the UWB IC 360, may be up-converted into a second RF signal (e.g., an RF signal of 24 GHZ) by the RFIC 340. According to various embodiments, the frequency band of the first RF signal may be at least partially identical or different from the frequency band of the second RF signal. According to various embodiments, the frequency band of the IF signal or RF signal (first RF signal or second RF signal) is described as an example for understanding, and various embodiments described below are not limited to the above-described frequency bands.

Figure 6:
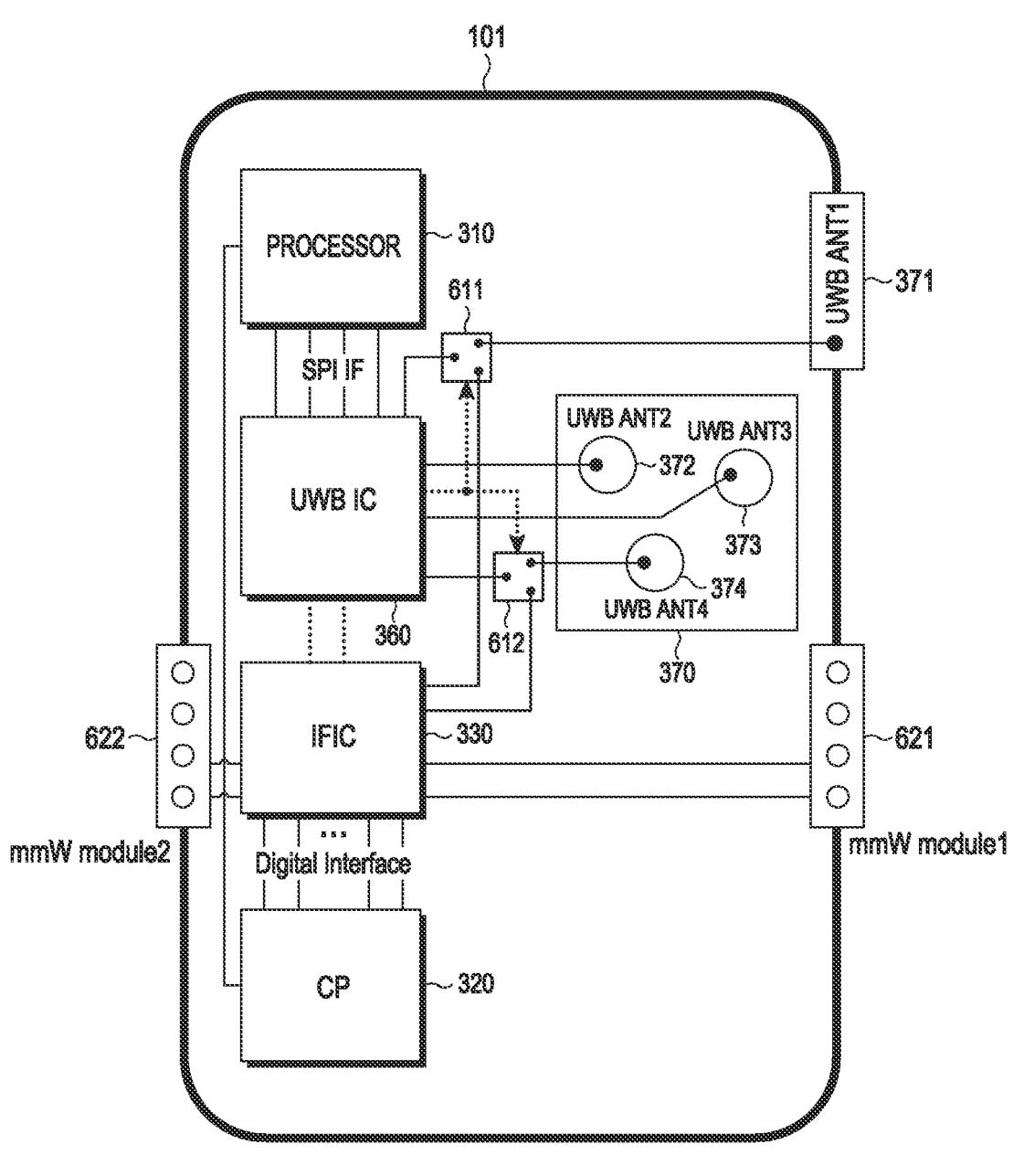
FIG. 6 is a block diagram illustrating an electronic device according to various embodiments.

According to various embodiments, the electronic device 101 may increase the performance of UWB by transmitting the UWB signal through the RFIC 340 and the antenna array 350 in a time period during which the communication processor 320 does not perform wireless communication through the RFIC 340 and the antenna array 350. For example, the antenna array 350 may be configured in a mmWave module. A plurality of mmWave modules may be spaced apart from each other in the electronic device 101 as illustrated in FIG. 6. As the plurality of mmWave modules are spaced apart from each other, and the UWB IC 360 transmits/receives the UWB signal through the mmWave modules, it is possible to secure isolation between the antennas, thus enhancing the performance of UWB. According to various embodiments, the electronic device 101 may secure signal straightness and thus increase sensing accuracy by up-converting the UWB signal generated from the UWB IC into an RF signal in a relatively high frequency band, through the mmWave module and transmitting the RF signal in the relatively high frequency band. According to various embodiments, the electronic device 101 may transmit/receive the UWB signal using a relatively large number of antennas, as illustrated in FIG. 12, by transmitting the UWB signal generated by the UWB IC 360 through the mmWave module while the mmWave module is not used for transmission of the wireless communication signal generated by the communication processor 320, thus providing the function of motion detection or gesture detection using radar technology.

According to various embodiments, the UWB IC 360 may be configured to transmit the UWB signal to the RFIC 340 directly or via the IFIC 330. According to various embodiments, to configure to allow the RFIC 340 to process the UWB signal generated by the UWB IC 360, the UWB IC 360 may be configured to transmit/receive control information to/from the communication processor 320 or the IFIC 330, and the relevant detailed embodiments are described below with reference to FIG. 6. The UWB IC 360 may be connected with the communication processor 320 and/or the IFIC 330 through various communication schemes (e.g., a bus, I2C, GPIO, SPI, or MIPI) and may be configured to exchange signals (e.g., commands or data) therebetween. In the following description, it is described that the UWB IC 360 is configured to transmit/receive data to and from the communication processor 320 and/or the IFIC 330 through a GPIO, but embodiments are not limited to the communication interface.

Figure 7:
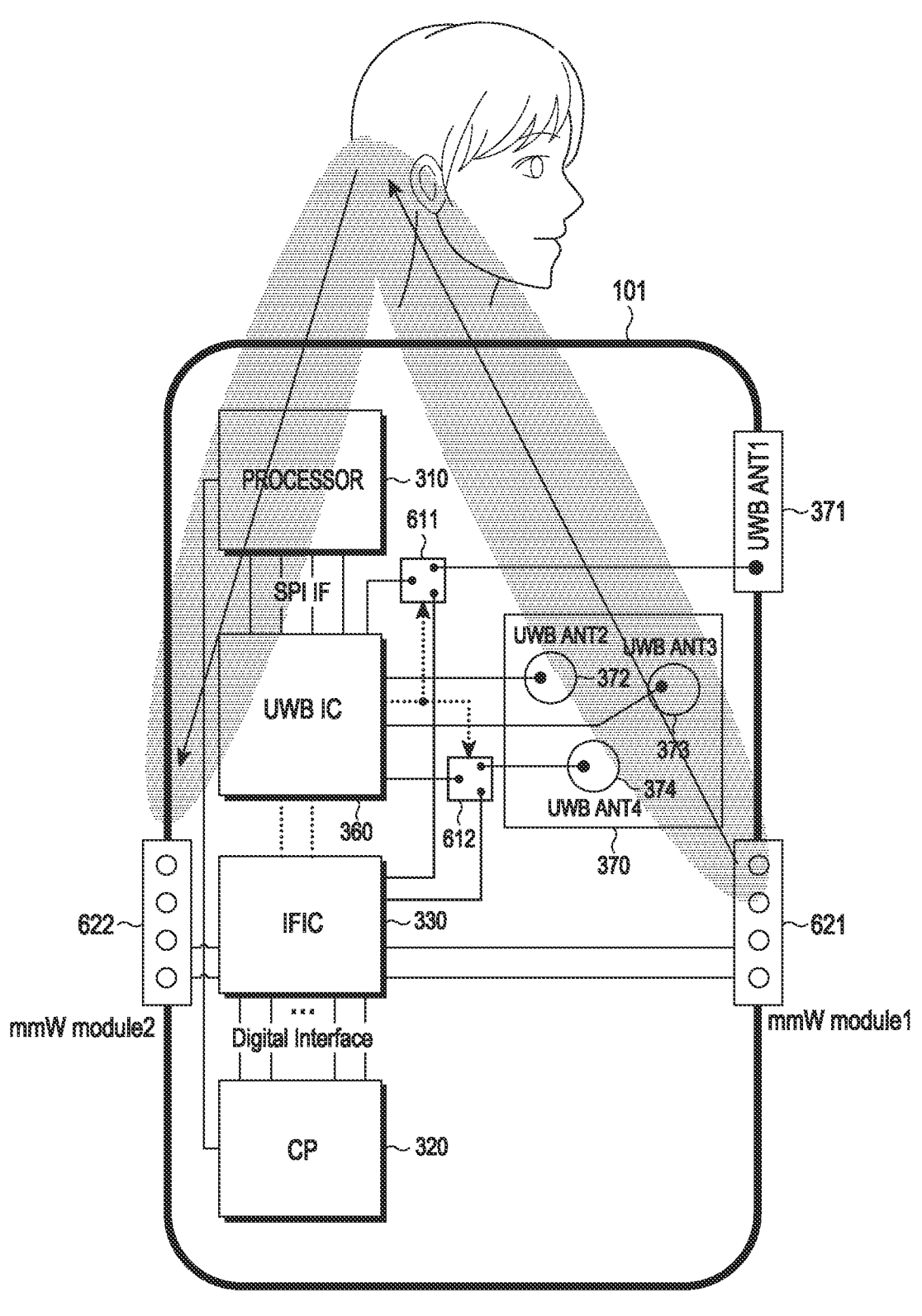
FIG. 7 is a view illustrating a sensing scenario of an electronic device supporting UWB technology, according to various embodiments.

FIGS. 6 and 7 are block diagrams illustrating an electronic device according to various embodiments. Referring to FIG. 6, an electronic device 101 may include a processor 310, a communication processor 320, an IFIC 330, a UWB IC 360, a UWB antenna 370, and at least one first switch 611 and 612, a first mm Wave module 621, or a second mmWave module 622. According to various embodiments, as described above, the first mmWave module 621 or the second mm Wave module 622 may include the RFIC 340 and the antenna array 350, respectively, of FIG. 5. Although FIG. 6 illustrates that the electronic device 101 include two mmWave modules 621 and 622, the electronic device 101 may include three or more mmWave modules. The plurality of mmWave modules disposed in the electronic device 101 may be isolated from each other and may be spaced apart from each other by a certain distance or more, or disposed to face in different directions to form beams in different directions. According to various embodiments, the mmWave modules 621 and 622 each may include an RFIC (e.g., the RFIC 340 of FIG. 5) as illustrated in FIG. 12, configured to convert the IF signal into an RF signal corresponding to the mmWave (e.g., 20 GHz to 300 GHz). The IF signal converted into the RF signal may be wirelessly transmitted through a plurality of antenna elements (e.g., the antenna array 350).

According to various embodiments, the communication processor 320 may be configured to generate a baseband signal based on a control signal from the processor 310. The baseband signal generated by the communication processor 320 may be transferred to the IFIC 330. The IFIC 330 may be configured to generate a signal (IF signal) in an intermediate frequency (IF) band based on the baseband signal received from the communication processor 320 and may transfer the generated IF signal to at least one mmWave modules 621 and 622. The at least one mmWave module 621 and 622 may convert the IF signal received from the IFIC 330 into a first RF signal (e.g., a signal in a 28 GHz frequency band) and then wirelessly transmit it through the array antenna. According to various embodiments, as described above, each of the mmWave modules 621 and 622 may be configured so that the RFIC (e.g., the RFIC 340 of FIG. 5) and the antenna array (e.g., the antenna array 350 of FIG. 5) are arranged on the same substrate.

According to various embodiments, the UWB IC 360 may generate a UWB signal based on a control signal of the processor 310. According to various embodiments, the UWB signal may correspond to a signal (e.g., 3 to 10 GHz signal) having a center frequency and a bandwidth set for each channel based on a UWB standard (e.g., IEEE 802.15.4 or IEEE 802.15.6), but is not limited thereto. For example, the UWB signal may be generated as a signal corresponding to Table 1 described above according to the UWB standard.

According to various embodiments, the UWB IC 360 may transmit the generated UWB signal through the transmit antenna of the UWB antenna 370. The UWB signal wirelessly transmitted through the transmit antenna (e.g., the first UWB antenna 371) of the UWB antenna 370 may be reflected by an object and then received through the receive antenna (e.g., the second UWB antenna 372, the third UWB antenna 373, or the fourth UWB antenna 374) of the UWB antenna 370. The UWB signal received through the UWB antenna 370 may be transmitted to the UWB IC 360. As described above in connection with FIG. 3, the UWB IC 360 may identify the distance from, or movement of, the object, based on the UWB signal transmitted through the transmit antenna of the UWB antenna 370 and the UWB signal received through the receive antenna of the UWB antenna 370.

According to various embodiments, the communication processor 320 may transmit/receive wireless communication signals (e.g., 3G communication signals, LTE communication signals, or 5G communication signals) through the IFIC 330 and at least one mmWave module 621 and 622. According to various embodiments, the UWB IC 360 may transmit/receive the UWB signal through the at least one mmWave module 621 and 622 during a time period when the communication processor 320 does not perform wireless communication through the at least one mmWave module 621 and 622 (e.g., during a time period when no wireless communication signal is transmitted/received). According to various embodiments, the UWB IC 360 may select any one of the at least one mmWave module 621 and 622 or the UWB antenna 370 and transmit/receive the UWB signal during a time period when the communication processor 320 does not perform wireless communication through the at least one mmWave module 621 and 622 (e.g., during a time period when no wireless communication signal is transmitted/received). For example, the UWB IC 360 may control to transmit/receive the UWB signal through the at least one mmWave module 621 and 622 when sensing (e.g., gesture sensing) requiring relatively high accuracy is needed, during a time period when the communication processor 320 does not perform wireless communication through the at least one mmWave module 621 and 622 (e.g., during a time period when no wireless communication signal is transmitted/received). Further, the UWB IC 360 may also control to transmit/receive the UWB signal through the UWB antenna 370 during a time period when the communication processor 320 does not perform wireless communication through the at least one mmWave module 621 and 622 (e.g., during a time period when no wireless communication signal is transmitted/received), when sensing (e.g., distance sensing) requiring relatively low accuracy is needed.

According to various embodiments, when the UWB IC 360 is to transmit the UWB signal through the UWB antenna 370, the first switch (e.g., the 1-1th switch 611 and the 1-2th switch 612) may be controlled so that the UWB signal output terminal of the UWB IC 360 is connected with each antenna (e.g., the first UWB antenna 371, the second UWB antenna 372, the third UWB antenna 373, and the fourth UWB antenna 374) of the UWB antenna 370.

According to various embodiments, when the UWB IC 360 is to transmit the UWB signal through at least one mmWave module 621 and 622, the first switch (e.g., the 1-1th switch 611 and the 1-2th switch 612) may be controlled so that the UWB signal output terminal of the UWB IC 360 is connected to the IFIC 330 or at least one mmWave module 621 and 622. For example, the UWB signal in the IF frequency band, output from the UWB signal output terminal of the UWB IC 360, may be transmitted to the IFIC 330 through the first switches 611 and 612. The IFIC 330 may transmit the UWB signal received through the first switches 611 and 612 to the first mmWave module 621 and/or the second mmWave module 622. The first mmWave module 621 and/or the second mmWave module 622 may receive a UWB signal in an IF frequency band from the IFIC 330, convert it into a second RF signal (e.g., a 24 GHz frequency band signal) through the RFIC (e.g., the RFIC 340 of FIG. 5), and then wirelessly transmit it through the antenna array 350 (e.g., the antenna array 350 of FIG. 5).

According to various embodiments, when it is assumed that the UWB signal is transmitted through the antenna array of the first mmWave module 621, and the UWB signal is received through the antenna array of the second mmWave module 622, the UWB signal in the RF band, transmitted from the first mmWave module 621, may be reflected by an object (e.g., a person's body or head), and the reflected UWB signal may be received through the second mmWave module 622 as illustrated in FIG. 7. The signal received through the antenna array of the second mmWave module 622 may be converted into an IF frequency band signal through the RFIC (e.g., the RFIC 340 of FIG. 5). The second mmWave module 622 may transmit the received signal, which has been converted into the IF frequency band signal, to the UWB IC 360 through the first switches 611 and 612. The UWB IC 360 may determine the distance from the object, movement of the object, or the user's gesture, based on the UWB signal transmitted form the UWB IC 360 through the first mmWave module 621 and the UWB signal received through the second mmWave module 622. According to various embodiments, when the UWB IC 360 performs more accurate sensing using the UWB signal, the UWB IC 360 may set the direction and shape of the transmit beam by adjusting the respective phases of the antenna arrays in the mmWave modules 621 and 622, as illustrated in FIG. 12.

According to various embodiments, the UWB IC 360 may receive information for whether the communication processor 320 performs wireless communication through the at least one mmWave module 621 and 622, through the communication processor 320 or the IFIC 330. The UWB IC 360 may control the first switches 611 and 612 to transmit the UWB signal, output from the UWB IC 360, to the IFIC 330 or the UWB antenna 370 during a time period when the communication processor 320 does not perform wireless communication through the at least one mmWave module 621 and 622 (e.g., during a time period when no wireless communication signal is transmitted/received). According to various embodiments, the UWB IC 360 may transmit a control signal to the communication processor 320 or the IFIC 330 so that the UWB signal output from the UWB IC 360 and transmitted to the IFIC 330 may be transmitted to the at least one mmWave module 621 and 622 during a time period when the communication processor 320 does not perform wireless communication through the at least one mmWave module 621 and 622 (e.g., during a time period when no wireless communication signal is transmitted/received). This is described below in greater detail with reference to FIG. 8 or subsequent figures.

Figure 9A:
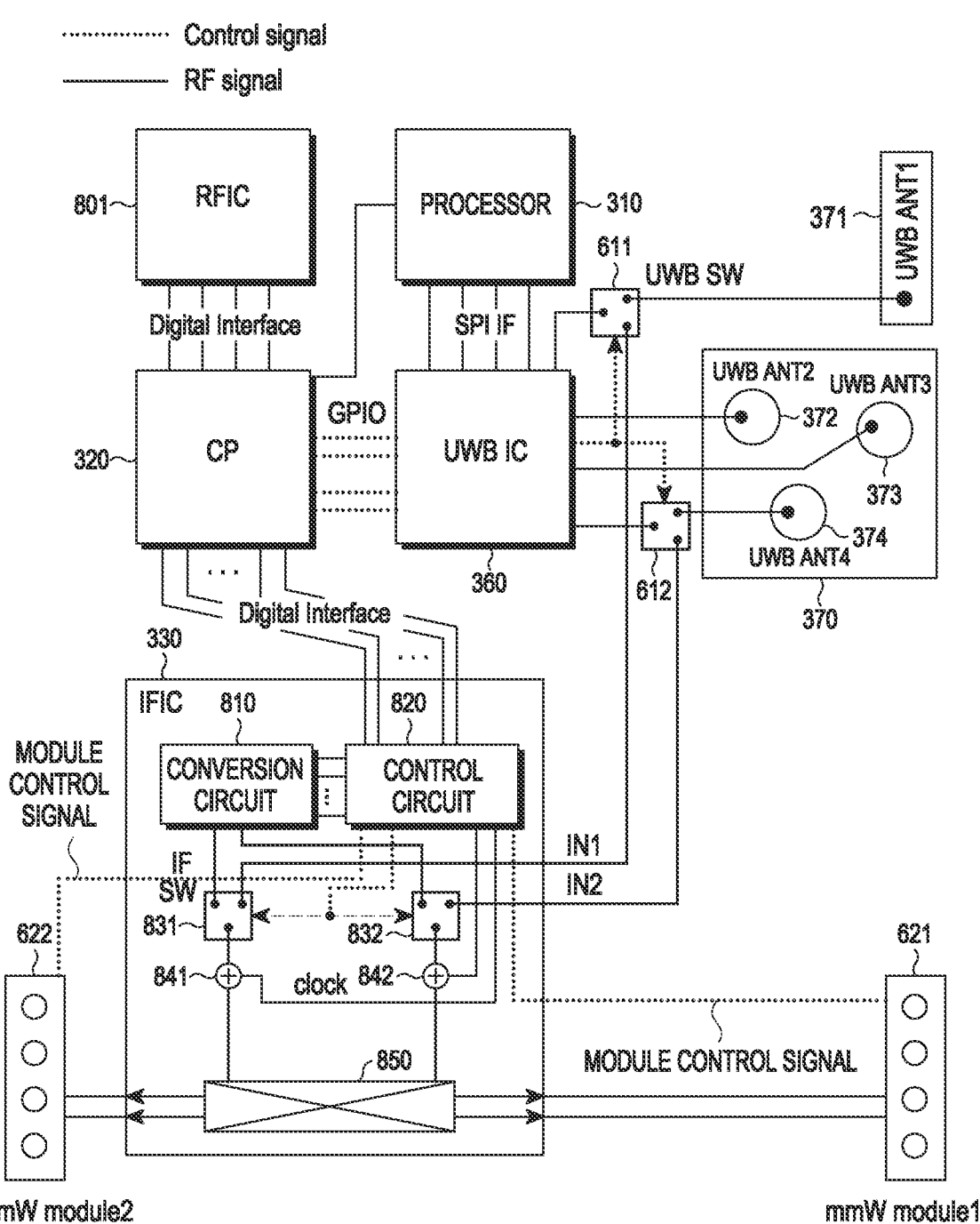
FIG. 9A is a block diagram illustrating an electronic device according to various embodiments.
Figure 9B:
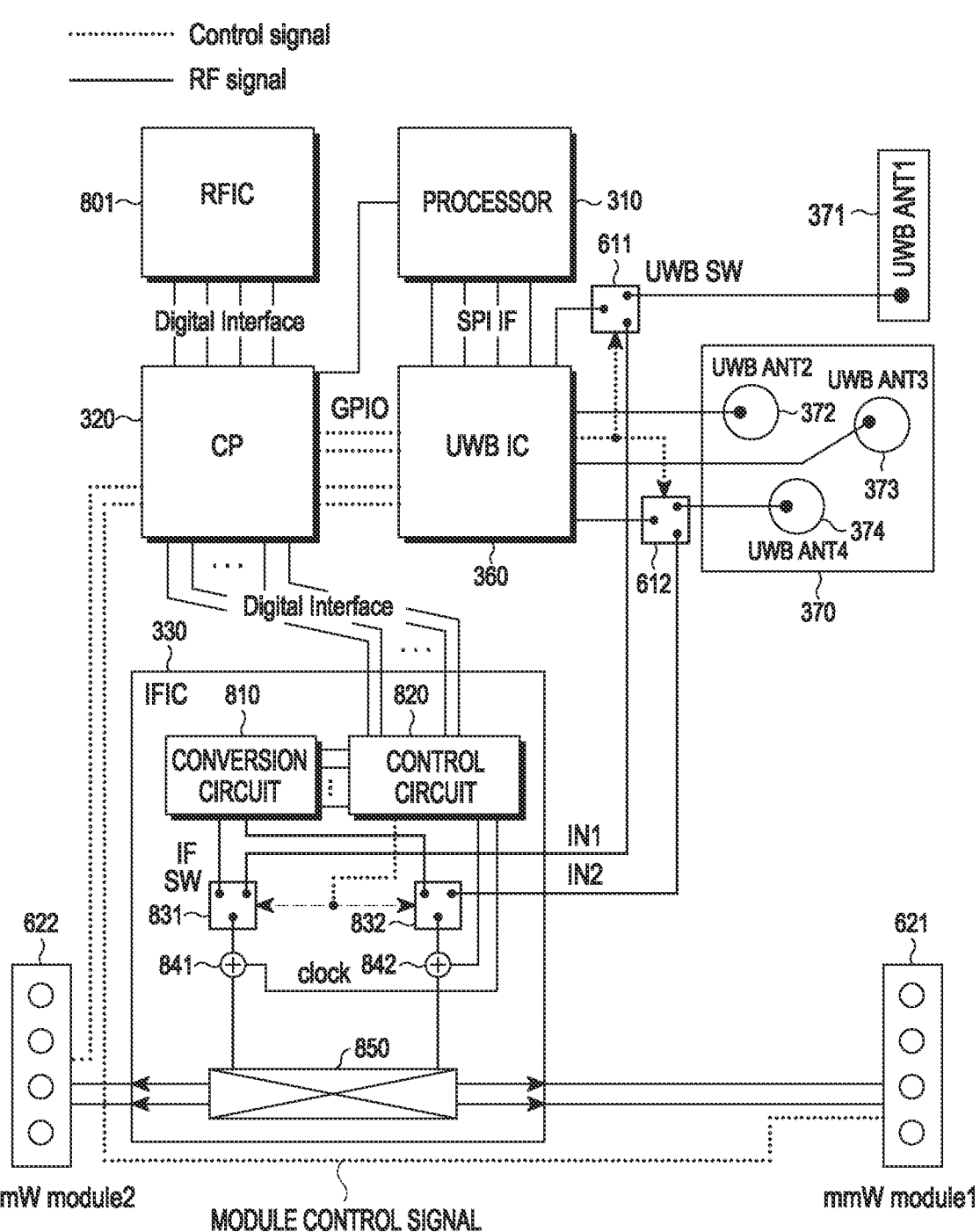
FIG. 9B is a block diagram illustrating an electronic device according to various embodiments.
Figure 10:
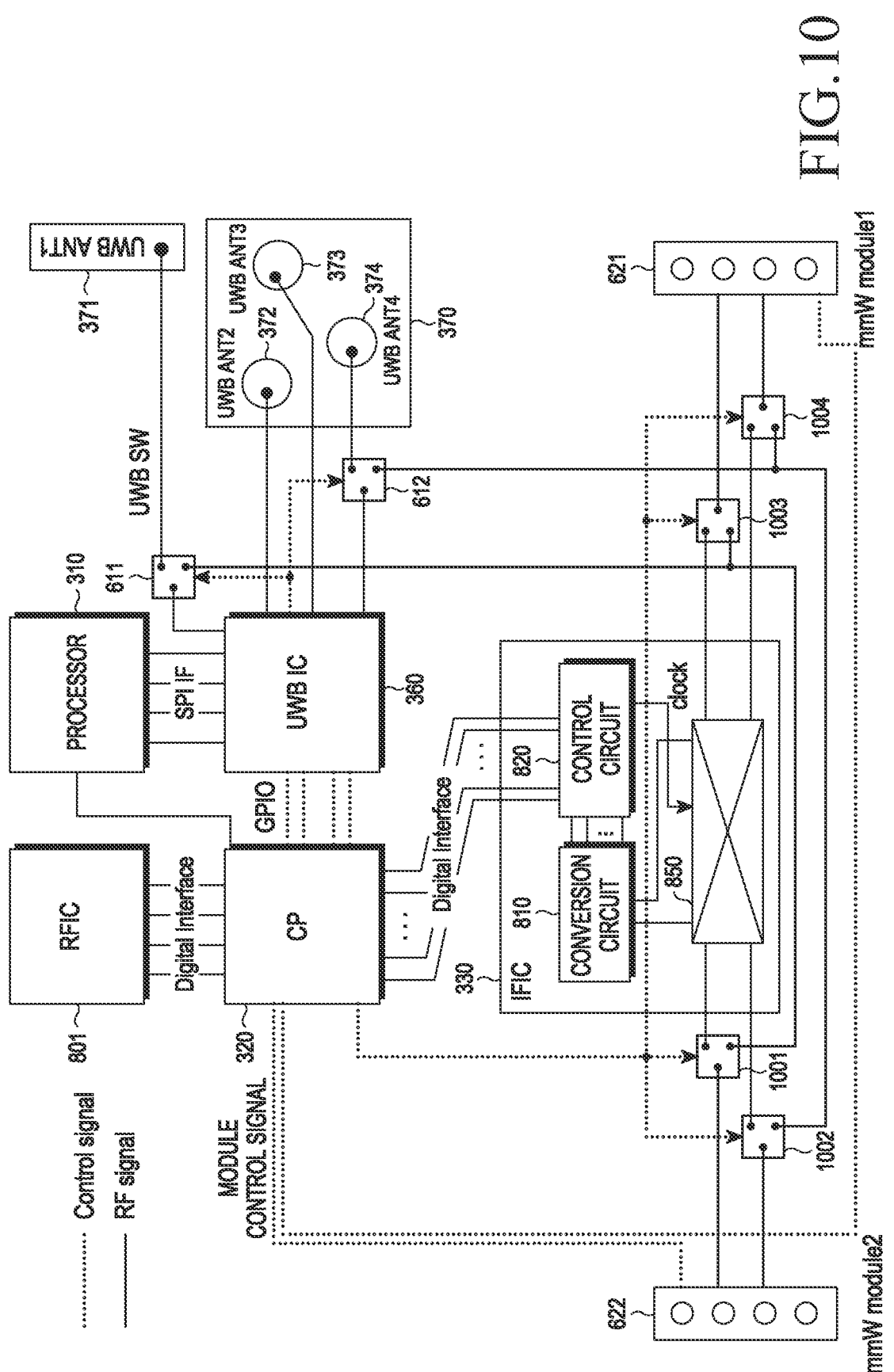
FIG. 10 is a block diagram illustrating an electronic device according to various embodiments.
Figure 11:
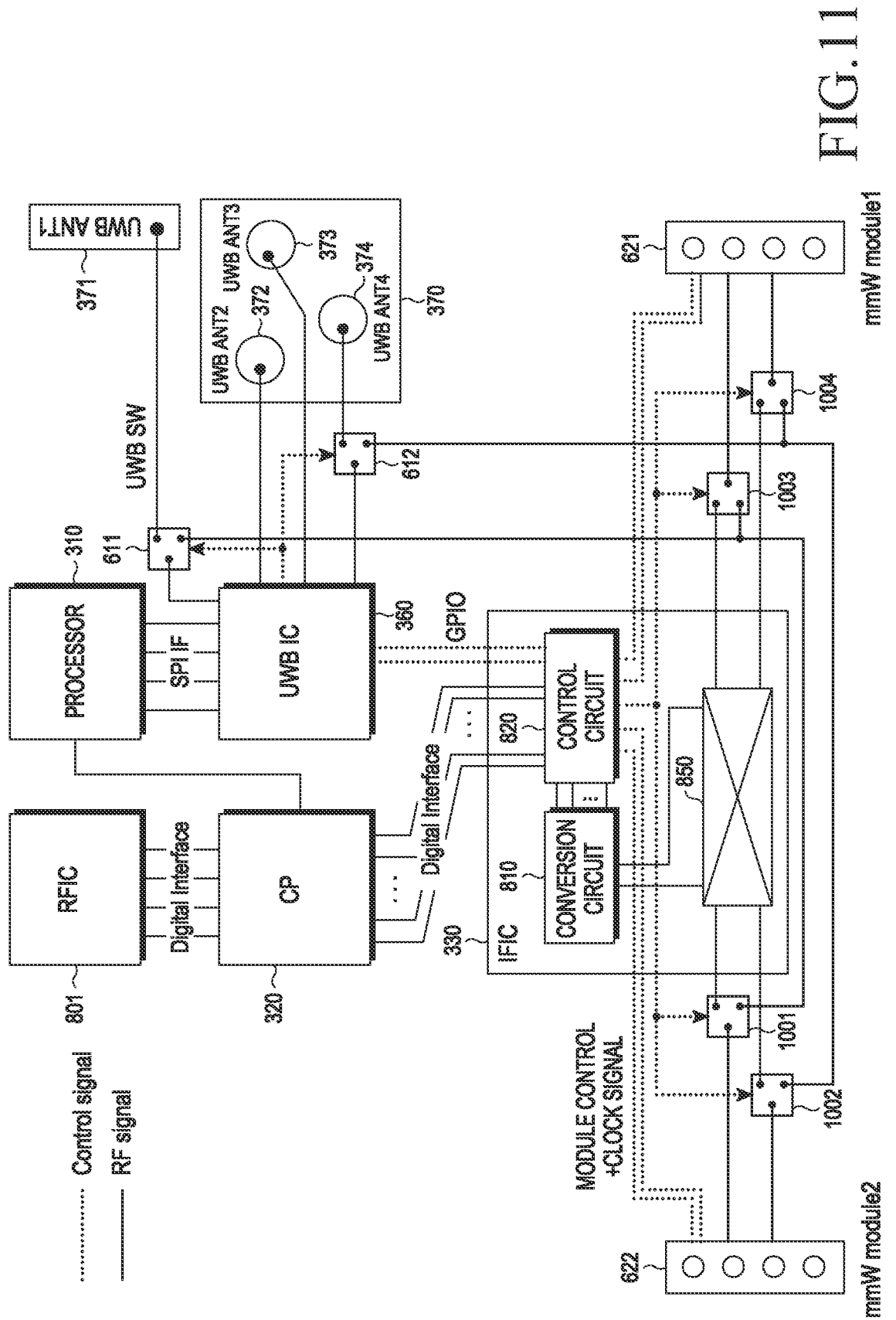
FIG. 11 is a block diagram illustrating an electronic device according to various embodiments.

Although FIGS. 6 and 7 illustrate that the UWB signal output from the UWB IC 360 is transmitted through the first switches 611 and 612 and the IFIC 330 to the at least one mmWave module 621 and 622, according to various embodiments, the UWB signal may be transmitted to the at least one mm Wave module 621 and 622 without passing through the IFIC 330 as illustrated in FIGS. 10 and 11 described below. Although FIGS. 6 and 7 illustrate that the UWB IC 360 transmits/receives the control signal to/from the IFIC 330 to control to transmit the UWB signal, transmitted from the UWB IC 360, through at least one mmWave module 621 and 622, according to various embodiments, the UWB IC 360 may transmit/receive the control signal to/from the communication processor 320 as illustrated in FIGS. 9A and 9B described below.

Figure 8:
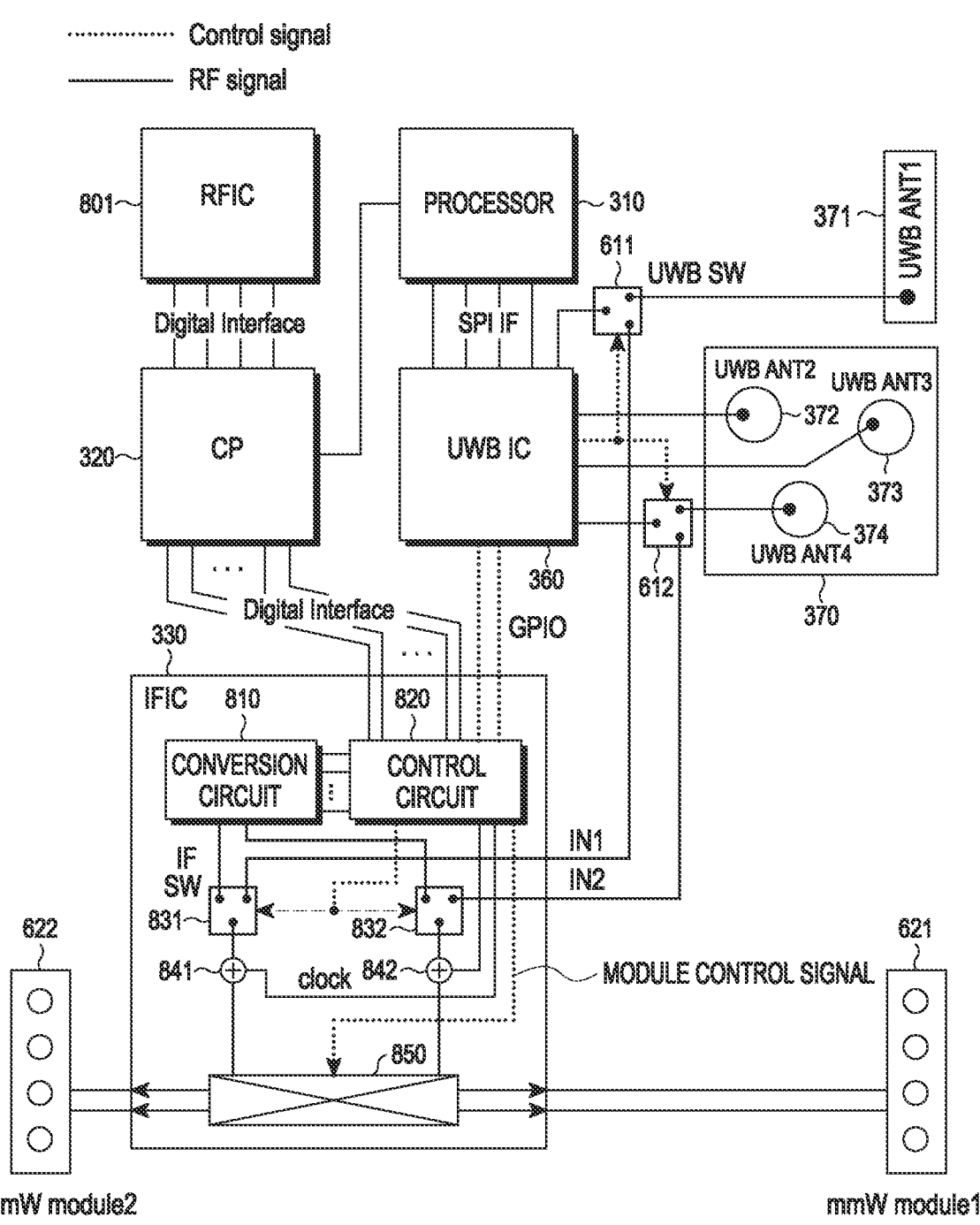
FIG. 8 is a block diagram illustrating an electronic device according to various embodiments.

FIGS. 8, 9A, and 9B are block diagrams illustrating an electronic device according to various embodiments. Referring to FIGS. 8, 9A, and 9B, an electronic device 101 may include an RFIC 801, a processor 310, a communication processor 320, an IFIC 330, a UWB IC 360, a UWB antenna 370, and at least one first switch 611 and 612, a first mmWave module 621, and a second mmWave module 622. According to various embodiments, the communication processor 320 may transmit an RF signal in an Sub6 band (e.g., about 6 GHz or less) (hereinafter, a 5G Sub6 RF signal), which is used in the second cellular network 294 (e.g., a 5G network), through the RFIC 801 (e.g., the second RFIC 224 of FIG. 2A or 2B). According to various embodiments, the communication processor 320 may transmit an RF signal in a 5G Above6 band (e.g., about 6 GHz to about 60 GHz) (hereinafter, a 5G Above6 RF signal), which is to be used in the second cellular network 294 (e.g., a 5G network), through the IFIC 330 and at least one mmWave module (e.g., the first mmWave module 621 or the second mmWave module 622).

According to various embodiments, as described above, the first mmWave module 621 or the second mmWave module 622 may include the RFIC 340 and the antenna array 350, respectively, of FIG. 5. Although FIG. 8 illustrates that the electronic device 101 include two mmWave modules

621 and 622, the electronic device 101 may include three or more mmWave modules. The plurality of mmWave modules disposed in the electronic device 101 may be isolated from each other and may be spaced apart from each other by a certain distance or more, or disposed to face in different directions to form beams in different directions. Since the same configuration of FIG. 8 as the configuration of FIG. 6 may perform at least identical or similar functions to the functions described above in connection with FIG. 6, a detailed description thereof is omitted.

According to various embodiments, the IFIC 330 may include a conversion circuit 810, a control circuit 820, second switches (e.g., a 2-1th switch 831 and a 2-2th switch 832), adders 841 and 842 (e.g., adding circuits), and a switching circuit 850. The conversion circuit 830 may include a frequency conversion circuit that converts the baseband signal received from the communication processor 320 into an IF frequency band signal. The conversion circuit 830 may further include an analog to digital converter (ADC) or a digital to analog converter (DAC). The control circuit 820 may receive a control signal from the communication processor 320 to control the IFIC 330 and/or at least one mmWave module 621 and 622.

According to various embodiments, the control circuit 820 may control the second switches 831 and 832 to selectively transmit the signal received from the communication processor 320 and the signal received from the UWB IC 360 to the mm Wave module 621 and 622. For example, if the UWB signal output from the UWB IC 360 is transmitted through the first switches 611 and 612 to the IFIC 330 during a time period when the communication processor 320 does not perform wireless communication through the at least one mmWave module 621 and 622 (e.g., during a time period when no wireless communication signal is transmitted/received), the control circuit 820 may control the second switches 831 and 832 to transmit the UWB signal, received through the first switches 611 and 612, through the switching circuit 850 to the at least one mmWave module 621 and 622.

According to various embodiments, during a time period when the communication processor 320 performs wireless communication through the at least one mmWave module 621 and 622 (e.g., during a time period when a wireless communication signal is transmitted/received), the baseband signal output from the communication processor 320 may be received by the IFIC 330, and the received baseband signal may be converted into an IF signal through the conversion circuit 810 of the IFIC 330. The control circuit 820 may control the second switches 831 and 832 to transmit the IF signal, converted through the conversion circuit 810, through the switching circuit 850 to the at least one mmWave module 621 and 622.

According to various embodiments, the adders 841 and 842 may be further included between the second switches 831 and 832 and the switching circuit 850. For example, the control circuit 820 may generate a reference clock signal to control the phase lock loop (PLL) output frequency of the at least one mmWave module 621 and 622. The reference clock signal may be generated at a set frequency (e.g., 500 to 600 MHZ). The control circuit 820 may include the generated reference clock signal in the IF signal through the adders 841 and 842 and transmit it to the at least one mmWave module 621 and 622. The at least one mmWave module 621 and 622 may up-convert the received IF signal into a desired RF frequency band signal by generating the signal corresponding to the PLL output frequency based on the reference clock signal transmitted along with the IF signal. According to various embodiments, the control circuit 820 may transmit a module control signal for setting the operation state of the at least one mmWave module 621 and 622 through the switching circuit 850 to the mmWave module 621 and 622. According to various embodiments, the module control signal may be configured so that the data corresponding to the setting value of Table 2 described below is serialized and transmitted, but embodiments are not limited thereto.

According to various embodiments, the first switches 611 and 612 or the second switches 831 and 832 may be controlled depending on whether the communication processor 320 performs wireless communication through the at least one mmWave module 621 and 622. For example, if the electronic device 101 is booted so that the communication processor 320 is activated, the communication processor 320 may identify whether wireless communication is performed through the at least one mmWave module 621 and 622. The state in which the communication processor 320 performs wireless communication through the at least one mmWave module 621 and 622 may be referred to as a state in which the at least one mmWave module 621 and 622 is activated for convenience of description.

For example, the communication processor 320 may identify whether the at least one mm Wave module 621 and 622 is activated and, if it is identified that the at least one mmWave module 621 and 622 is not activated, the control circuit 820 may control the second switches 831 and 832 to transmit the UWB signal, output from the UWB IC 360 and input through the IN1 terminal and the IN2 terminal, to the at least one mmWave module 621 and 622. According to various embodiments, the control circuit 820 of the IFIC 330 may transmit a setting value (e.g., 'RDY Flag set') for indicating that the at least one mmWave module 621 and 622 may process the UWB signal output from the UWB IC 360, through the communication interface (e.g., GPIO) connected with the UWB IC 360 to the UWB IC 360. According to various embodiments, to perform a sensing operation by outputting a UWB signal, the UWB IC 360 may control the first switches 611 and 612 based on the setting value received from the control circuit 820 of the IFIC 330, allowing the UWB signal output from the UWB IC 360 to be input to the IFIC 330.

As another example, the communication processor 320 may identify whether the at least one mmWave module 621 and 622 is activated and, if it is identified that the at least one mmWave module 621 and 622 is activated, the control circuit 820 may control the second switches 831 and 832 to transmit the signal received from the communication processor 320, to the at least one mmWave module 621 and 622. According to various embodiments, the control circuit 820 of the IFIC 330 may transmit a setting value (e.g., 'RDY Flag unset') for indicating that the at least one mmWave module 621 and 622 may not process the UWB signal output from the UWB IC 360, through the communication interface (e.g., GPIO) connected with the UWB IC 360, by the UWB IC 360. According to various embodiments, to perform a sensing operation by outputting a UWB signal, the UWB IC 360 may control the first switches 611 and 612 based on the setting value received from the control circuit 820 of the IFIC 330, allowing the UWB signal output from the UWB IC 360 to be transmitted to the UWB antenna 370.

According to various embodiments, even in a state where the at least one mmWave module 621 and 622 is not activated so that the UWB signal is processable through the at least one mmWave module 621 and 622 when the UWB IC 360 is to perform a sensing operation by outputting the UWB signal, the UWB IC 360 may control to allow UWB signal to be transmitted through the UWB antenna

370 according to a set condition. For example, when the activation state of the at least one mmWave module 621 and 622 is frequently changed, or the sensing (e.g., distance sensing) requires relatively less accuracy, although the UWB signal is processable through the at least one mmWave module 621 and 622, the first switches 611 and 612 may be controlled so that the UWB signal output from the UWB IC 360 is transmitted through the UWB antenna 370.

According to various embodiments, when the electronic device 101 is to transmit the UWB signal, output from UWB IC 360, through the IFIC 330 and the at least one mmWave module 621 and 622, the electronic device 101 may reduce power consumption by minimizing the operation of the communication processor 320. For example, if the at least one mmWave module 621 and 622 is in the state of being not activated, the communication processor 320 may transmit the setting value (e.g., a setting value for controlling the at least one mmWave module 621 and 622) stored in the memory (e.g., a non-volatile (NV) memory) to the IFIC 330. According to various embodiments, the setting value may be configured as shown in Table 2 below. The setting values in Table 2 below are provided as examples, and various embodiments are not limited thereto.

TABLE 2

| Register | Module TX/RX Mode | Active Chain | Phase Code for each Chain | TX Gain Index | RX Gain Index | PLL Frequency Setting Values |
|---|---|---|---|---|---|---|
| Reg1 | TX | 1 | 0 | 15 | 10 | 24.125 GHz UWB 9CH center freq |
| Reg1 | RX | 1, 2, 3, 4 | 0, 2, 4, 6 | 0 | 0 | 24.125 GHz UWB 5CH center freq |
| . . . | | | | | | |
| RegN | RX | 1, 2 | 0, 8 | 10 | 2 | 24.125 GHz UWB 9CH center freq |

Referring to Table 2, the setting value may be correspond to a value of a register (e.g., an index of a register), and each register value may correspond to a combination of setting values for controlling at least one component included in each mmWave module 621 and 622. According to various embodiments, the setting value may include at least one of information regarding a transmission mode or reception mode, information regarding an activated chain among a plurality of chains included in the RFIC, a phase code for each chain, information related to the gain of the transmit signal amplifier, information related to the gain of the receive signal amplifier, or frequency setting value information. According to various embodiments, the UWB IC 360 may control each component in the mmWave module 621 and 622 to be able to process the UWB signal, which is to be transmitted, through the mmWave module 621 and 622 by selecting any one from among the set register values.

For example, when the register value is 1 (Reg 1), the mmWave module 621 and 622 may be configured to operate in the transmission mode (Tx mode), chain 1 may be activated, the phase code value of chain 1 may be set to 0, the gain index of the transmit signal amplifier may be set to 15, and the gain index of the receive signal amplifier may be set to 10. The PLL frequency setting value may be set to 24.125 GHz-8.9856 (UWB 9CH center freq.) so that the UWB signal (e.g., channel signal of UWB 9) may be converted into an RF signal of 24.125 GHz through the mmWave module. For example, when the register value is 2 (Reg 2), the mmWave module 621 and 622 may be configured to operate in the reception mode (Rx mode), chains 1, 2, 3, and 4 may be activated, the respective phase code values of the chains may be set to 0, 2, 4, and 6, and the gain index of the transmit signal amplifier and the gain index of the receive signal amplifier may be set to 0. The PLL frequency setting value may be set to 24.125 GHz-6.9888 (UWB 5CH center freq.) so that the UWB signal (e.g., channel signal of UWB 5) may be converted into an RF signal of 24.125 GHz through the mmWave module. For example, when the register value is N (Reg N), the mmWave module 621 and 622 may be configured to operate in the reception mode (Rx mode), and chains 1 and 2 may be activated, and the respective phase code values of the chains may be set to 0 and 8, the gain index of the transmit signal amplifier may be set to 10, and the gain index of the receive signal amplifier may be set to 2. The PLL frequency setting value may be set to 24.125 GHz-8.9856 (UWB 9CH center freq.) so that the UWB signal (e.g., channel signal of UWB 9) may be converted into an RF signal of 24.125 GHz through the mmWave module.

The setting values corresponding to each register value in the above-described Table 2 are exemplary, and at least one other setting value may be added, or at least one setting value among the exemplified setting values may be excluded. Among the setting values corresponding to the register values, setting values which need not be changed although the UWB signal is transmitted, may be excluded.

According to various embodiments, the communication processor 320 may control to transmit the setting value of the register to the IFIC 330 and then operate in a sleep state according to a predetermined schedule or to perform communication signal processing operations (e.g., Sub6/LTE/ 3G/2G communication operations) irrelevant to the mmWave module 621 and 622 not to involve the processing related to the UWB IC 360.

According to various embodiments, the UWB IC 360 may receive, from the control circuit 820 of the IFIC 330, the setting value (e.g., 'RDY Flag set') for indicating that the at least one mmWave module 621 and 622 may process the UWB signal output from the UWB IC 360 and transmit the setting value for controlling the mmWave module 621 and 622 to the IFIC 330. The setting value for controlling the mmWave module 621 and 622 may include the register values (e.g., register index or register address information) of Table 2 described above. The IFIC 330 may transmit the control signal to the mmWave module 621 and 622 based on the setting value for controlling the mmWave module 621 and 622 received from the UWB IC 360.

According to various embodiments, if it is identified that the at least one mmWave module 621 and 622 is in the activated state while performing the operation, the control circuit 820 of the IFIC 330 may control the second switches 831 and 832 to allow the signal, received from the communication processor 320, to be transmitted to the at least one mmWave module 621 and 622, and may change the setting value for controlling the at least one mmWave module 621 and 622 from the setting value received from the UWB IC 360 to the setting value corresponding to the state in which the mmWave module 621 and 622 are activated. For example, the control circuit 820 of the IFIC 330 may disregard the setting value received from the UWB IC 360 and change the setting value transferred from the communication processor 320 (e.g., the value set to transmit/receive a wireless communication signal) so that the signal received from the communication processor 320 may be transmitted to the at least one mm Wave module 621 and 622.

According to various embodiments, as an example of comparison with FIG. 8, referring to FIGS. 9A and 9B, the UWB IC 360 may transmit/receive control signals to/from the communication processor 320 instead of the IFIC 330. For example, the communication processor 320 may identify whether the at least one mmWave module 621 and 622 is activated and, if it is identified that the at least one mmWave module 621 and 622 is not activated, transmit a setting value (e.g., 'RDY Flag set') for indicating that the at least one mmWave module 621 and 622 may process the UWB signal output from the UWB IC 360, to the UWB IC 360 through the communication interface (e.g., GPIO) connected with the UWB IC 360. According to various embodiments, to perform a sensing operation by outputting a UWB signal (e.g., to perform a sensing operation using the at least one mmWave module 621 and 622 instead of the UWB antenna 370), the UWB IC 360 may control the first switches 611 and 612 based on the setting value received from the communication processor 320, allowing the UWB signal output from the UWB IC 360 to be input to the IFIC 330.

According to various embodiments, referring to FIGS. 9A and 9B, the UWB IC 360 may receive, from the communication processor 320, the setting value (e.g., 'RDY Flag set') for indicating that the at least one mmWave module 621 and 622 may process the UWB signal output from the UWB IC 360, and transmit the setting value for controlling the mmWave module 621 and 622 to the communication processor 320. The setting value for controlling the mmWave module 621 and 622 may include the register values (e.g., register index or register address information) of Table 2 described above. The communication processor 320 may transmit, to the control circuit 820 of the IFIC 330, the setting value for controlling the mmWave module 621 and 622, received from the UWB IC 360, as illustrated in FIG. 9A, and the control circuit 820 of the IFIC 330 may transmit a module control signal to the mm Wave module 621 and 622 based on the setting value.

As another example, the communication processor 320 may transmit the module control signal, corresponding to the setting value for controlling the mmWave module 621 and 622 received from the UWB IC 360, to the mmWave module 621 and 622 as illustrated in FIG. 9B.

According to various embodiments, if it is identified that the at least one mmWave module 621 and 622 is in the activated state while performing the operation, the communication processor 320 may change the setting value received from the UWB IC 360 to the setting value corresponding to the activated state of the mmWave module 621 and 622. For example, the communication processor 320 may disregard the setting value received from the UWB IC 360 and change it to the value set for transmitting/receiving the wireless communication signal so that the wireless communication signal generated from the communication processor 320 may be transmitted through the at least one mmWave module 621 and 622.

FIGS. 10 and 11 are block diagrams illustrating an electronic device according to various embodiments. Referring to FIGS. 10 and 11, the second switches 831 and 832 included in the IFIC 330 in FIGS. 8, 9A, and 9B may be disposed outside the IFIC 330. For example, referring to FIGS. 10 and 11, third switches 1001 and 1002 and fourth switches 1003 and 1004 may be included outside the IFIC 330.

According to various embodiments, the third switches 1001 and 1002 may be connected with the second mmWave module 622, and the fourth switches 1003 and 1004 may be connected with the first mm Wave module 621. According to various embodiments, when the at least one mmWave module 621 and 622 is identified as activated, the communication processor 320 may control the third switches 1001 and 1002 and/or the fourth switches 1003 and 1004 so that the IFIC 330 is connected to the at least one mmWave module 621 and 622. If the at least one mmWave module 621 and 622 is identified as not activated, the communication processor 320 may control the third switches 1001 and 1002 and/or the fourth switches 1003 and 1004 so that the UWB signal output from the UWB IC 360 is transmitted through the first switches 611 and 612 to the at least one mmWave module 621 and 622.

According to various embodiments, referring to FIG. 10, the communication processor 320 may transmit the module control signal for controlling the at least one mmWave module 621 and 622 directly to each mmWave module 621 and 622. In this case, the reference clock signal for each mmWave module 621 and 622 may be transmitted to each mmWave module 621 and 622 through the switching circuit 850 in the control circuit 820.

As another example, referring to FIG. 11, the communication processor 320 may transmit the setting value for controlling each mmWave module 621 and 622 to the control circuit 820 of the IFIC 330. The control circuit 820 of the IFIC 330 may transmit the module control signal and the reference clock signal to the mmWave module 621 and 622 based on the setting value.

FIG. 12 illustrates a structure of a mmWave module connected to an IFIC according to various embodiments. Referring to FIG. 12, a mmWave module (e.g., the antenna module 197 of FIG. 1 or the third antenna module 246 of FIG. 2A or 2B) may include an RFIC 1220 and an antenna array 1210. According to various embodiments, the RFIC 1220 may include a PLL 1221, amplifiers 1222-1 and 1222-2, a first mixer 1223-1, a second mixer 1223-2, a first splitter/combiner 1231, a second splitter/combiner 1232, a plurality of phase shifters 1241, 1242, 1243, 1244, 1245, and/or 1246, a plurality of power amplifiers (PAS) 1251-1, 1252-1, 1253-1, 1254-1, 1255-1, and/or 1256-1, and/or a plurality of low noise amplifiers (LNAs) 1251-2, 1252-2, 1253-2, 1254-2, 1255-2, and/or 1256-2.

Referring to FIG. 12, the antenna array 1210 may include a plurality of antenna elements. The plurality of antenna elements may include a first antenna element 1211, a second antenna element 1212, and a third antenna element 1213. Each of the antenna elements may include feeding points of H-pols 1211-1, 1212-1, and 1213-1 and V-pols 1211-2, 1212-2, and 1213-2.

Referring to FIG. 12, the IF H signal may be mixed with an FLO signal provided by the amplifier 1222-1 through the first mixer 1223-1 and input to the first splitter/combiner 1231. The signal input to the first splitter/combiner 1231 may be branched into N signals and transmitted to the first phase shifter 1241, the third phase shifter 1243, or the fifth phase shifter 1245. The signals phase-shifted through each phase shifter 1241, 1243, and 1245 may be amplified through the PA 1251-1, 1253-1, and 1255-1 and then transmitted through the H-pols 1211-1, 1212-1, and 1213-1 to the wireless space. The IF V signal may be mixed with the $F_{LO}$ signal through the second mixer 1223-2 and input to the second splitter/combiner 1232. The signal input to the second splitter/combiner 1232 may be branched into N signals and transmitted to the second phase shifter 1242, the fourth phase shifter 1244, or the sixth phase shifter 1246. The signals phase-shifted through each phase shifter 1242, 1244, and 1246 may be amplified through the PA 1252-1, 1254-1, and 1256-1 and then transmitted through the V-pols 1211-2, 1212-2, and 1213-2 to the wireless space.

According to various embodiments, the signals received through the H-pols 1211-1, 1212-1, and 1213-1 may be amplified through the LNAs 1251-2, 1253-2, and 1255-2 and then transmitted to the first phase shifter 1241, the third phase shifter 1243, or the fifth phase shifter 1245. The signals phase-shifted through the phase shifters 1241, 1243, and 1245 may be combined in the first splitter/combiner 1231 and transmitted to the first mixer 1223-1. The first mixer 1223-1 may be configured to receive the combined signal from the first splitter/combiner 1231 and mix it with the $F_{LO}$ signal, outputting the IF H signal. The signals received through the V-pols 1211-2, 1212-2, and 1213-2 may be amplified through the LNAs 1252-2, 1254-2, and 1256-2 and then transmitted to the second phase shifter 1242, the fourth phase shifter 1244, or the sixth phase shifter 1246. The signals phase-shifted through the phase shifters 1242, 1244, and 1246 may be combined in the first splitter/combiner 1232 and transmitted to the second mixer 1223-2. The second mixer 1223-2 may be configured to receive the combined signal from the second splitter/combiner 1232 and mix it with the FLO signal, outputting the IF V signal. The IF H signal and the IF V signal may be transferred to the IFIC (e.g., the IFIC 330 of FIG. 5). The IFIC may convert the IF signal into a baseband signal and transfer it to the communication processor (e.g., the communication processor 320 of FIG. 5).

According to various embodiments, the RFIC 1220 may convert the IF signal received through the IFIC 330 into an RF signal as described above. For example, the RFIC 1220 may control each component included in the RFIC 1220 based on the setting value received from the IFIC 330. The setting value received from the IFIC 330 may include the setting values corresponding to the register values of Table 2 described above. For example, the RFIC 1220 may receive the UWB signal and may control each component according to each setting value corresponding to the register value (e.g., the register index) exemplified in Table 2 above.

According to various embodiments, the transmission path and the reception path of the RFIC 1220 may be controlled based on information regarding the transmission mode or reception mode among the setting values. The corresponding chain among the N chains included in the RFIC 1220 may be activated based on information regarding the activated chain among the setting values. Based on the phase code for each chain among the setting values, the respective phase values of the phase shifters 1241, 1242, 1243, 1244, 1245, and 1246 of the corresponding chain may be adjusted. Based on the information related to the gain of the transmit signal amplifier among the setting values, the respective gain values of the PA 1251-1, 1252-1, 1253-1, 1254-1, 1255-1, and 1256-1 may be adjusted. Based on the information related to the gain of the receive signal amplifier among the setting values, the respective gain values of the LNAs 1251-2, 1252-2, 1253-2, 1254-2, 1255-2, and 1256-2 may be adjusted.

According to various embodiments, the output frequency of the PLL 1221 may be set based on the PLL frequency setting value among the setting values. For example, the RFIC 1220 of the mmWave modules 621 and 622 may receive the PLL frequency setting value (e.g., the PLL frequency setting value of Table 2) from the IFIC 330. The PLL 1221 of the RFIC 1220 may set an output frequency of a local oscillator (OS) based on the received PLL frequency setting value.

According to various embodiments, as described above, the IFIC 330 may receive a reference clock signal for controlling the output frequency of the PLL 1221 together with the IF signal. For example, the reference clock signal may be a clock signal corresponding to 500 to 600 MHz. According to various embodiments, the PLL 1221 may generate a signal corresponding to the output frequency of the PLL 1221 based on the PLL frequency setting value and the reference clock signal. For example, the output frequency of the PLL 1221 may be set by Equation 1 below.

$$PLL \text{ output frequency} = \text{Reference clock frequency} \times \frac{M}{N} \qquad \text{[Equation 1]}$$

The RFIC 1220 may generate a signal of the output frequency of the PLL 1221 from the reference clock frequency by setting M and N from the output frequency of the PLL 1221 and the reference clock frequency. For example, when the UWB signal input to the RFIC 1220 is an IF signal of UWB channel 9 and has a center frequency of 7.656 GHz, an LO signal of 16.469 GHz may be output from the PLL 1221 for up-conversion to 24.125 GHz corresponding to an industrial scientific medical (ISM) frequency band through the RFIC 1220. To output the 16.469 GHz signal, the IFIC 330 may generate a reference clock frequency of 588.178 MHz and transmit it to the RFIC 1220. If M is set to 28, and N is set to 1 according to Equation 1, the RFIC 1220 may generate a PLL output frequency of 16.469 GHz.

Figure 13:
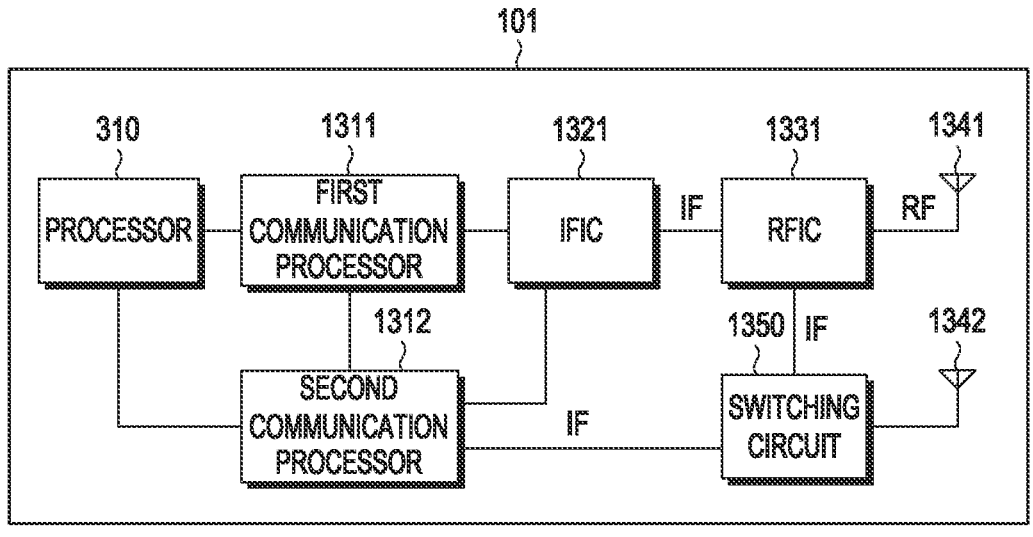
FIG. 13 is a block diagram illustrating an electronic device according to various embodiments.

FIG. 13 is a block diagram illustrating an electronic device according to various embodiments. Referring to FIG. 13, an electronic device 101 may include a processor 310, a first communication processor 1311, an IFIC 1321, an RFIC 1331, a first antenna 1341, a second communication processor 1312, a switching circuit 1350, and a second antenna 1342. According to various embodiments, the RFIC 1331 and the first antenna 1341 may be included in at least one antenna module (e.g., mmWave module).

According to various embodiments, the processor 310 may be the processor 120 of FIG. 1 and may be referred to as, e.g., an application processor (AP). According to various embodiments, the first communication processor 1311 may be the second communication processor 214 of FIG. 2A or the integrated communication processor 260 of FIG. 2B and may be referred to as a communication processor (CP). According to various embodiments, the IFIC 1321 may be the fourth RFIC 228 of FIG. 2A or 2B. According to various embodiments, the RFIC 1331 may be the third RFIC 226 of FIG. 2A or 2B. According to various embodiments, the first antenna 1341 may be the antenna 248 of FIG. 2A or 2B. According to various embodiments, the first antenna 1341 may include a plurality of antenna elements.

According to various embodiments, the first communication processor 1311 may generate a baseband signal based on a control signal from the processor 310. The baseband signal generated by the first communication processor 1311 may be transferred to the IFIC 1321. The IFIC 1321 may generate a first IF signal based on the baseband signal received from the first communication processor 1311 and transfer the generated first IF signal to the RFIC 1331. The RFIC 1331 having received the first IF signal from the IFIC

1312 may convert the first IF signal into a first RF signal and then transmit the converted first RF signal through the first antenna 1341.

According to various embodiments, the second communication processor 1312 (e.g., the UWB IC 360) may generate a second IF signal (e.g., a UWB signal) based on the control signal of the processor 310. According to various embodiments, the second communication processor 1312 may transmit the second IF signal through the switching circuit 1350 and the transmit antenna of the second antenna 1342. The second IF signal wirelessly transmitted through the second antenna 1342 may be reflected by, e.g., an object and then received through the receive antenna of the second antenna 1342. The second IF signal received through the second antenna 1342 may be transmitted to the second communication processor 1312. The second communication processor 1312 may identify the movement of an object or the distance from the object based on the second IF signal transmitted through the transmit antenna of the second antenna 1342 and the second IF signal received through the receive antenna of the second antenna 1342.

According to various embodiments, the first communication processor 1311 may transmit/receive wireless communication signals (e.g., 3G communication signals, LTE communication signals, or 5G communication signals) through the IFIC 1321, the RFIC 1331, and the first antenna 1341. According to various embodiments, the second communication processor 1312 may transmit/receive the second IF signal, generated by the second communication processor 1312, through the switching circuit 1350 and the RFIC 1331 and the first antenna 1341, during a time period when the first communication processor 1311 does not perform communication through the RFIC 1331 and the first antenna 1341 (e.g., during a time period when no wireless communication signal is transmitted/received). For example, the second communication processor 1312 may transmit the second IF signal to the RFIC 1331 directly or through the IFIC 1321 in the time period during which the first communication processor 1311 does not perform wireless communication through the RFIC 1331 and the first antenna 1341. The switching circuit 1350 may be controlled by at least one of the processor 310, the first communication processor 1311, or the second communication processor 1312. The RFIC 1331 may receive a second IF signal from the second communication processor 1312 and may convert the received second IF signal into a second RF signal. According to various embodiments, the first IF signal and the second IF signal may have at least partially the same frequency band or different frequency bands. According to various embodiments, the first RF signal and the second RF signal may have at least partially the same frequency band or different frequency bands.

According to various embodiments, the electronic device 101 may transmit the second IF signal generated from the second communication processor 1312 through the RFIC 1331 and the first antenna 1341 in the time period during which the first communication processor 1311 does not perform wireless communication through the RFIC 1331 and the first antenna 1341, thereby increasing the sensing performance of the second IF signal. The electronic device 101 may perform control so that the second IF signal output from the second communication processor 1312 is transmitted through the second antenna 1342 directly or the second IF signal is converted into a second RF signal through the RFIC 1331 and then transmitted, according to the sensing function of the application operated by the processor 310. According to various embodiments, the second RF signal may provide an enhanced sensing function as compared with the second IF signal. For example, the electronic device 101 may secure signal straightness and thus increase sensing accuracy by up-converting the second IF signal generated from the second communication processor 1312 into the second RF signal in a relatively high frequency band, through the RFIC 1331 and transmitting it. According to various embodiments, the electronic device 101 may transmit the second IF signal generated from the second communication processor 1312 through the RFIC 1331 and the first antenna 1341 during a time when the RFIC 1331 is not used for transmission of the wireless communication signal generated by the first communication processor 1311, thereby providing a motion detection or gesture detection function using radar technology.

Operation methods of the electronic device according to various embodiments are described below with reference to FIGS. 14 to 16.

Figure 14:
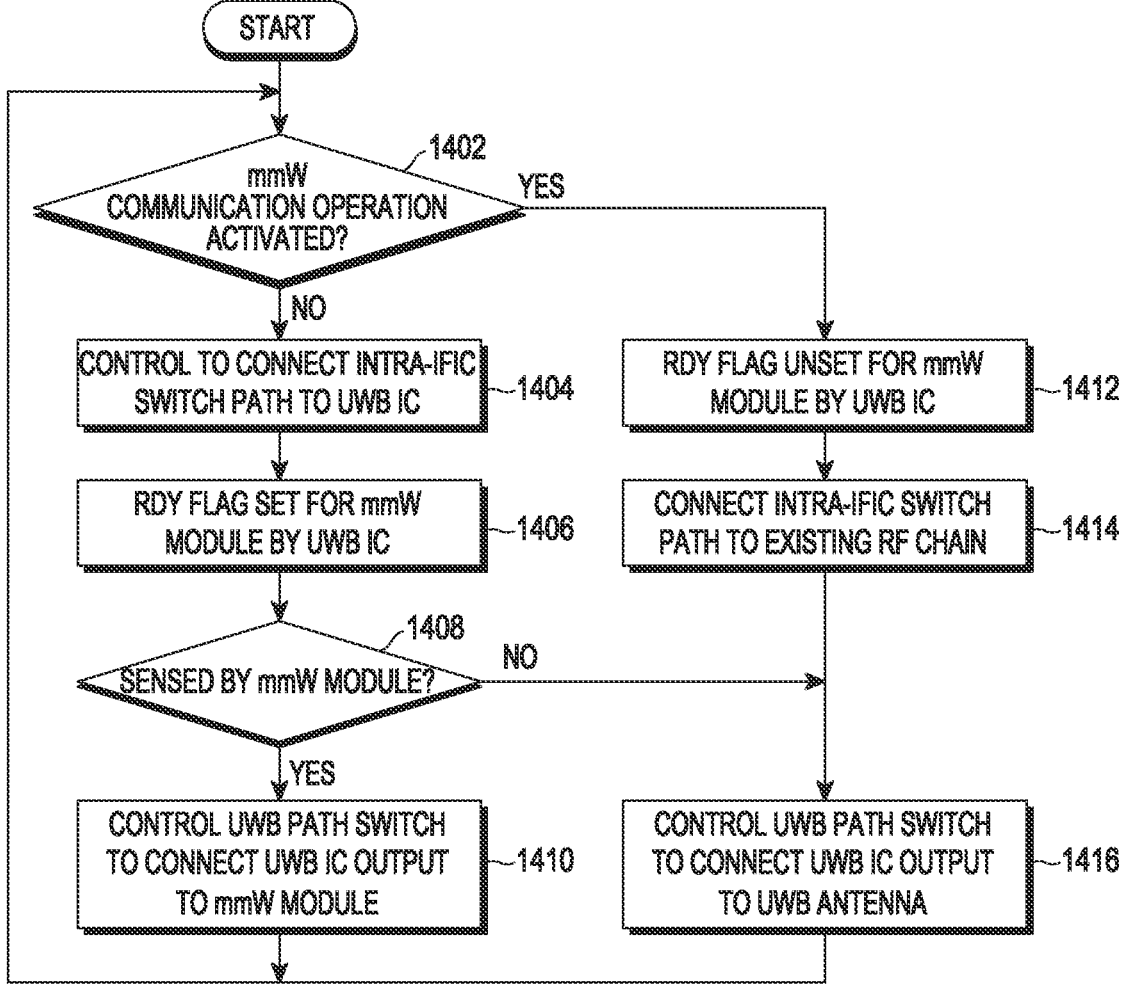
FIG. 14 is a flowchart illustrating an operation method of an electronic device according to various embodiments.

FIG. 14 is a flowchart illustrating an operation method of an electronic device according to various embodiments. Referring to FIG. 14, in operation 1402, the electronic device 101 may determine whether a communication operation for the mmWave module by the communication processor is activated. As a result of the determination, if the communication operation for the mmWave module is activated (Yes in operation 1402), the electronic device 101 (e.g., the communication processor or IFIC) may set the RDY flag for the mm Wave module to the UNSET state and transmit it, by the UWB IC in operation 1412.

According to various embodiments, in operation 1414, the electronic device may control to transmit the IF signal, generated based on the baseband signal generated by the communication processor, to the mmWave module by connecting the path of the switch (e.g., the second switches 831 and 832) disposed inside the IFIC to the existing RF chain. According to various embodiments, in operation 1416, the electronic device may control the UWB path switch (e.g., the first switches 611 and 612) so that the output of the UWB IC is connected to the UWB antenna.

According to various embodiments, when it is determined in operation 1402 that the communication operation for the mmWave module is not activated (No in operation 1402), the electronic device 101 (e.g., the communication processor or IFIC) may control to connect the path of the switch (e.g., the second switches 831 and 832) disposed inside the IFIC to the UWB IC in operation 1404. According to various embodiments, in operation 1406, the electronic device may set the RDY flag for the mmWave module to the SET state and transmit it to the UWB IC.

According to various embodiments, in operation 1408, the electronic device 101 may identify whether sensing is performed using the mmWave module in the activated state of the UWB IC operation. When it is identified that the UWB IC operation is not activated or that sensing using the mmWave module in the activated state of the UWB IC operation is not performed (No in operation 1408) (e.g., in the case of sensing requiring relatively low accuracy (e.g., distance sensing)), the electronic device may control the UWB path switch (e.g., the first switches 611 and 612) to connect the output of the UWB IC to the UWB antenna in operation 1416. When it is identified that the UWB IC operation is activated and sensing is to be performed using the mm Wave module (Yes in operation 1408) (e.g., in the case of sensing requiring relatively high accuracy (e.g., gesture sensing)), the electronic device may control the UWB path switch (e.g., the first switches 611 and 612) to connect the output of the UWB IC to the mmWave module in operation 1410.

Figure 15:
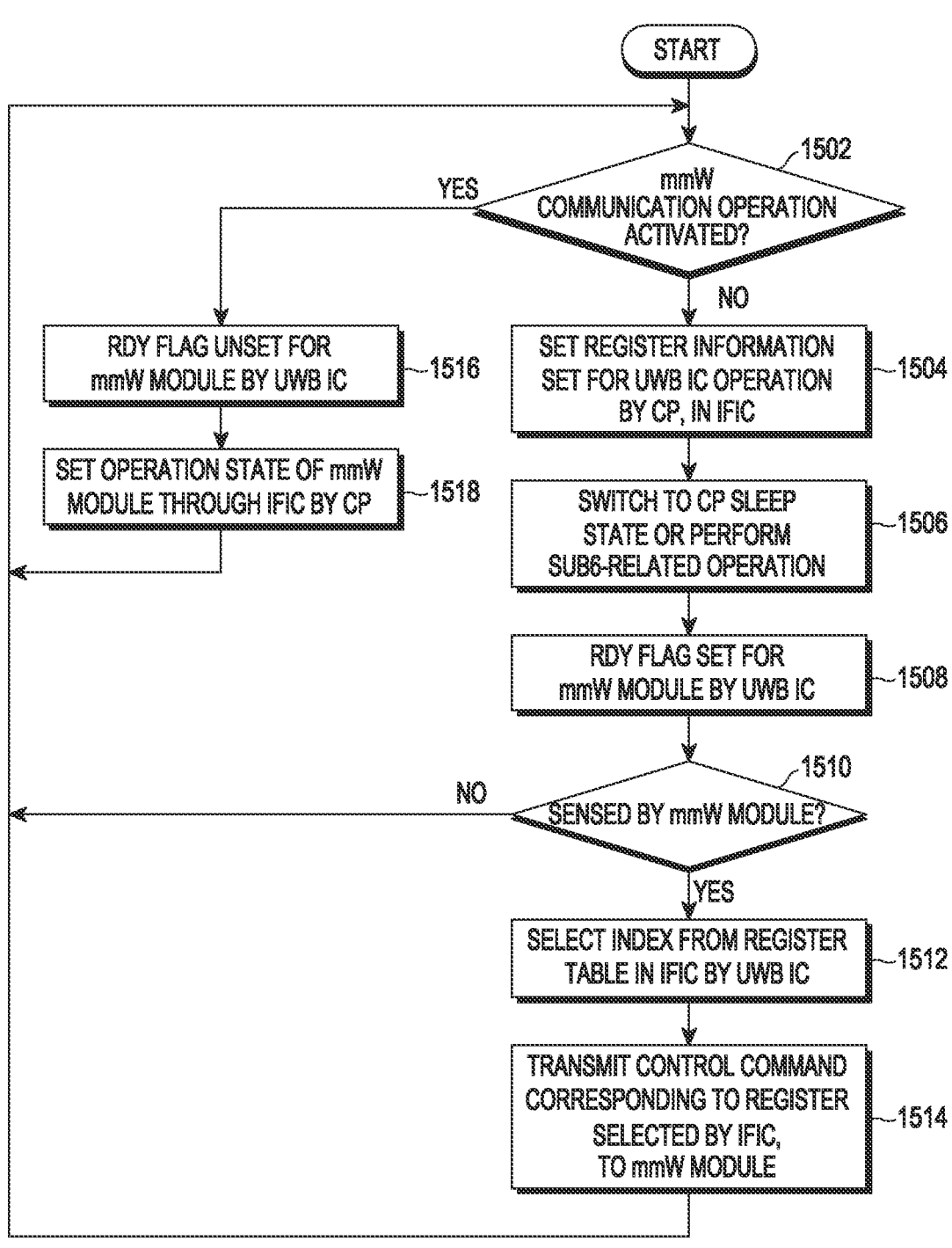
FIG. 15 is a flowchart illustrating an operation method of an electronic device according to various embodiments.

FIG. 15 is a flowchart illustrating an operation method of an electronic device according to various embodiments. Referring to FIG. 15, in operation 1502, the electronic device 101 may determine whether a communication operation for the mmWave module by the communication processor is activated. As a result of the determination, if the communication operation for the mmWave module is activated (Yes in operation 1502), the electronic device 101 (e.g., the communication processor or IFIC) may set the RDY flag for the mm Wave module to the UNSET state and transmit it, by the UWB IC in operation 1516. In operation 1518, the electronic device may set the operation state of the mmWave module through the IFIC in the communication processor.

According to various embodiments, when it is determined in operation 1502 that the communication operation for the mmWave module is not activated (No in operation 1502), the communication processor of the electronic device 101 may set the register information set for UWB IC operation in the IFIC in operation 1504. According to various embodiments, the communication processor of the electronic device may switch to the sleep state or perform the operation related to the Sub6 band in operation 1506. The electronic device (e.g., the communication processor or IFIC) may set the RDY flag for the mmWave module to the SET state and transmit it to the UWB IC in operation 1508.

According to various embodiments, in operation 1510, the electronic device 101 may identify whether sensing is performed using the mmWave module in the activated state of the operation of the UWB IC. When it is identified that the UWB IC operation is not activated or that sensing using the mmWave module in the activated state of the UWB IC operation is not performed (No in operation 1510) (e.g., in the case of sensing requiring relatively low accuracy (e.g., distance sensing)), the electronic device may continuously identify whether the mmWave communication operation is activated in operation 1502. When it is identified that the UWB IC operation is activated, and sensing is to be performed using the mmWave module (Yes in operation 1510) (e.g., in the case of sensing requiring relatively high accuracy (e.g., gesture sensing)), the UWB IC of the electronic device may select any one register index (or register address) from the register table (e.g., the table exemplified in Table 2) in the IFIC and transmit the selected information to the IFIC in operation 1512. The IFIC of the electronic device may transmit a control command corresponding to the register selected by the UWB IC to the mmWave module in operation 1514.

Figure 16:
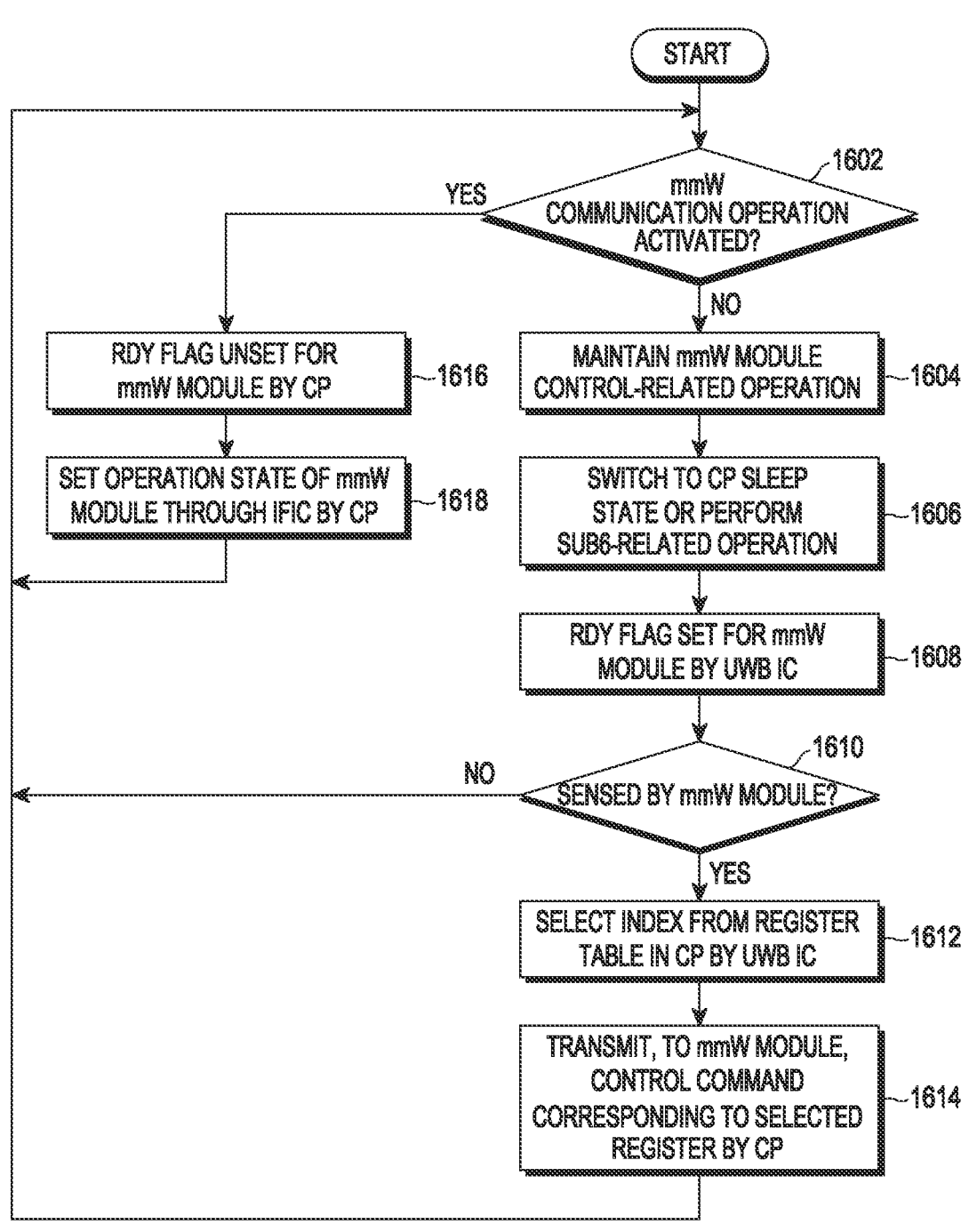
FIG. 16 is a flowchart illustrating an operation method of an electronic device according to various embodiments.

FIG. 16 is a flowchart illustrating an operation method of an electronic device according to various embodiments. Referring to FIG. 16, in operation 102, the electronic device 101 may determine whether a communication operation for the mmWave module by the communication processor is activated. As a result of the determination, if the communication operation for the mmWave module is activated (Yes in operation 1602), the communication processor of the electronic device 101 may set the RDY flag for the mmWave module to the UNSET state and transmit it, by the UWB IC in operation 1616. In operation 1618, the communication processor of the electronic device may set the operation state of the mm Wave module through the IFIC.

According to various embodiments, when it is determined in operation 1602 that the communication operation for the mmWave module is not activated (No in operation 1602), the communication processor of the electronic device 101 may maintain the control-related operation of the mmWave module in operation 1604. According to various embodiments, the communication processor of the electronic device may switch to the sleep state or perform the operation related to the Sub6 band in operation 1606. The communication processor of the electronic device may set the RDY flag for the mmWave module to the SET state and transmit it to the UWB IC in operation 1608.

According to various embodiments, in operation 1610, the electronic device 101 may identify whether sensing is performed using the mmWave module in the activated state of the operation of the UWB IC. When it is identified that the UWB IC operation is not activated or that sensing using the mmWave module in the activated state of the UWB IC operation is not performed (No in operation 1610) (e.g., in the case of sensing requiring relatively low accuracy (e.g., distance sensing)), the electronic device may continuously identify whether the mmWave communication operation is activated in operation 1602. When it is identified that the UWB IC operation is activated, and sensing is to be performed using the mmWave module (Yes in operation 1610) (e.g., in the case of sensing requiring relatively high accuracy (e.g., gesture sensing)), the UWB IC of the electronic device may select any one register index (or register address) from the register table (e.g., the table exemplified in Table 2) in the communication processor and transmit the selected information to the communication processor in operation 1612. The communication processor of the electronic device may transmit a control command corresponding to the register selected by the UWB IC to the mmWave module through the IFIC in operation 1614.

According to any one of various embodiments, an electronic device may comprise a communication processor; an intermediate frequency integrated circuit (IFIC) connected with the communication processor and configured to convert a baseband signal received from the communication processor into an intermediate frequency (IF) signal; a radio frequency integrated circuit (RFIC) connected with the IFIC and configured to receive the IF signal and convert the received IF signal into a first radio frequency (RF) signal; an ultra-wideband (UWB) integrated circuit (IC) configured to generate a UWB signal corresponding to a first frequency; at least one UWB antenna connected with the UWB IC and configured to transmit/receive the UWB signal corresponding to the first frequency; and at least one first switch connected between the UWB IC and the UWB antenna. The at least one first switch may be controlled so that the UWB signal corresponding to the first frequency, generated by the UWB IC, is transmitted to the RFIC in a state in which a communication operation, for a signal transmitted/received from the communication processor, by the RFIC is inactivated.

According to various embodiments, the RFIC is configured to receive the UWB signal corresponding to the first frequency, generated by the UWB IC, through the at least one first switch, convert the received UWB signal corresponding to the first frequency into a second RF signal corresponding to a second frequency, and transmit, through at least one antenna, the UWB signal converted into the second RF signal corresponding to the second frequency.

According to various embodiments, the RFIC may include a mixer configured to receive, through the at least one first switch, the UWB signal corresponding to the first frequency generated by the UWB IC and mix a signal corresponding to a difference between the second frequency and the first frequency with the UWB signal.

According to various embodiments, the electronic device may further comprise at least one second switch connected with the at least one first switch. The at least one second switch may be configured to receive the IF signal and the UWB signal and be controlled so that the UWB signal is transmitted to the RFIC in the state in which the communication operation, for the signal transmitted/received from the communication processor, by the RFIC is inactivated.

According to various embodiments, the at least one second switch may be included in the IFIC.

According to various embodiments, the communication processor may be configured to transmit, to the UWB IC, information for whether the communication operation, for the signal transmitted/received from the communication processor, by the RFIC is inactivated.

According to various embodiments, the UWB IC may be configured to transmit, to at least one of the IFIC or the communication processor, information for controlling the RFIC, in the state in which the communication operation, for the signal transmitted/received from the communication processor, by the RFIC is inactivated.

According to various embodiments, the information for controlling the RFIC may include information for controlling a setting for at least one component included in the RFIC.

According to various embodiments, the information for controlling the RFIC may include at least one of information regarding a transmission mode or a reception mode, information regarding an activated chain among a plurality of chains included in the RFIC, a phase code for each chain, information related to a gain of a transmit signal amplifier, information related to a gain of a receive signal amplifier, or frequency setting value information.

According to various embodiments, the UWB IC may be configured to transmit, through the communication processor to the IFIC, the information for controlling the RFIC, in the state in which the communication operation, for the signal transmitted/received from the communication processor, by the RFIC is inactivated.

According to various embodiments, the information for controlling the RFIC may be configured to map to a code where a combination of preset values for each information is set and stored in a memory.

According to various embodiments, the UWB IC may transmit, to the IFIC, a code corresponding to the combination of the preset values for each information, in the state in which the communication operation, for the signal transmitted/received from the communication processor, by the RFIC is inactivated.

According to various embodiments, the UWB IC may be configured to transmit, through the communication processor to the IFIC or the RFIC, a code corresponding to the combination of the preset values for each information, in the state in which the communication operation, for the signal transmitted/received from the communication processor, by the RFIC is inactivated.

According to any one of various embodiments, an electronic device may comprise a first communication processor configured to generate a baseband signal; an intermediate frequency integrated circuit (IFIC) connected with the communication processor and configured to convert the baseband signal received from the communication processor into a first intermediate frequency (IF) signal; a radio frequency integrated circuit (RFIC) connected with the IFIC and configured to receive the first IF signal and convert the received first IF signal into a radio frequency (RF) signal; a first antenna configured to transmit the RF signal output from the RFIC; a second communication processor configured to generate a second IF signal; a second antenna connected with the second communication processor configured to transmit the second IF signal; and at least one switch connected between the second communication processor and the second antenna. The at least one switch may be controlled so that the second IF signal generated by the second communication processor is transmitted to the RFIC in a state in which a communication operation, for a signal transmitted/received from the first communication processor, by the RFIC is inactivated.

According to any one of various embodiments, a method for operating an electronic device may comprise receiving a baseband signal generated from a communication processor and converting the baseband signal into an IF signal, by an IFIC; receiving the IF signal and converting the IF signal into a first RF signal, by an RFIC; transmitting the first RF signal through a first antenna; generating a UWB signal corresponding to a first frequency by an ultra-wideband (UWB) integrated circuit (IC); transmitting the UWB signal corresponding to the first frequency through a second antenna; identifying that a communication operation, for a signal transmitted/received from the communication processor, by the RFIC is in an inactive state; transmitting the UWB signal to the RFIC, in response to identifying that the communication operation for the signal transmitted/received from the communication processor is in the inactive state; converting the UWB signal into a second RF signal by the RFIC; and transmitting the second RF signal through the first antenna.

According to various embodiments, the method may further comprise mixing the UWB signal with a signal corresponding to a difference between a second frequency corresponding to the second RF signal and the first frequency, by the RFIC, in response to identifying that the communication operation for the signal transmitted/received from the communication processor is in the inactive state.

According to various embodiments, the method may further comprise transmitting, to the UWB IC, information for whether the communication operation, for the signal transmitted/received from the communication processor, by the RFIC is inactivated.

According to various embodiments, the method may further comprise transmitting, to at least one of the IFIC or the communication processor, information for controlling the RFIC, in the state in which the communication operation, for the signal transmitted/received from the communication processor, by the RFIC is inactivated.

According to various embodiments, the information for controlling the RFIC may include information for controlling a setting for at least one component included in the RFIC.

According to various embodiments, the information for controlling the RFIC may be mapped to a code where a combination of preset values for each information is set and stored in a memory.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising,
at least one mmWave module configured to transmit and receive RF (radio frequency) signals;
memory storing instructions; and
at least one processor,
wherein the instructions, when executed by the at least one processor, cause the electronic device to:
transmit, through the at least one mmWave module, first RF signals for a wireless communication;
identify that a communication operation corresponding to the first RF signals is in an inactive state;
while the communication operation corresponding to the first RF signals is in the inactive state, transmit, through the at least one mmWave module, second RF signals for sensing an object;
in response to transmitting the second RF signals, identify third RF signals received through the at least one mm Wave module; and
based on the third RF signals, identify information related to the object.

2. The electronic device of claim 1, wherein the instructions, when executed by the at least one processor, causes the electronic device to:
based on the third RF signals, identify at least one of a distance from the object, a movement of the object, or a user's gesture.

3. The electronic device of claim 2, wherein the instructions, when executed by the at least one processor, causes the electronic device to:
based on a time difference between the second RF signals and the third RF signals, identify at least one of the distance from the object, the movement of the object, or the user's gesture.

4. The electronic device of claim 1, wherein the first RF signals correspond to at least one of 3G communication signals, LTE communication signals, or 5G communication signals.

5. The electronic device of claim 1, wherein the third RF signals correspond to signals received when the second RF signals are reflected by the object.

6. The electronic device of claim 1, wherein the second RF signals are transmitted through a first mmWave module from among the at least one mmWave module, and the third RF signals are received through a second mmWave module from among the at least one mm Wave module.

7. The electronic device of claim 6, wherein the first mm Wave module and the second mm Wave module are isolated from each other and spaced apart from each other.

8. The electronic device of claim 6, wherein the first mmWave module and the second mmWave module are disposed to face in different directions to form beams in different directions.

9. The electronic device of claim 1, wherein the instructions, when executed by the at least one processor, causes the electronic device to:
set a direction or a shape of a transmission beam corresponding to the second RF signals by adjusting phases of antenna arrays included in the at least one mmWave module.

10. The electronic device of claim 1, wherein a time period when the communication operation corresponding to the first RF signals is in the inactive state corresponds to a time period when the first RF signals for the wireless communication are not transmitted.

11. A method for operating an electronic device, the method comprising,
transmitting, through at least one mmWave module, first RF signals for a wireless communication,
identifying that a communication operation corresponding to the first RF signals is in an inactive state,
while the communication operation corresponding to the first RF signals is in the inactive state, transmitting, through the at least one mmWave module, second RF signals for sensing an object,
in response to transmitting the second RF signals, identifying third RF signals received through the at least one mmWave module, and
based on the third RF signals, identifying information related to the object.

12. The method of claim 11, further comprising:
based on the third RF signals, identifying at least one of a distance from the object, a movement of the object, or a user's gesture.

13. The method of claim 12, further comprising:
based on a time difference between the second RF signals and the third RF signals, identifying at least one of the distance from the object, the movement of the object, or the user's gesture.

14. The method of claim 11, wherein the first RF signals correspond to at least one of 3G communication signals, LTE communication signals, or 5G communication signals.

15. The method of claim 11, wherein the third RF signals correspond to signals received when the second RF signals are reflected by the object.

16. The method of claim 11, wherein the second RF signals are transmitted through a first mmWave module from among the at least one mmWave module, and the third RF signals are received through a second mmWave module from among the at least one mm Wave module.

17. The method of claim 16, wherein the first mmWave module and the second mmWave module are isolated from each other and spaced apart from each other.

18. The method of claim 16, wherein the first mmWave module and the second mmWave module are disposed to face in different directions to form beams in different directions.

19. The method of claim 11, further comprising:

setting a direction or a shape of a transmission beam corresponding to the second RF signals by adjusting phases of antenna arrays included in the at least one mmWave module.

20. The method of claim 11, wherein a time period when the communication operation corresponding to the first RF signals is in the inactive state corresponds to a time period when the first RF signals for the wireless communication are not transmitted.

21. A non-transitory computer-readable medium storing instructions which, when executed by at least one processor of an electronic device, cause the electronic device to perform operations comprising:

transmitting, through at least one mmWave module, first RF signals for a wireless communication, identifying that a communication operation corresponding to the first RF signals is in an inactive state, while the communication operation corresponding to the first RF signals is in the inactive state, transmitting, through the at least one mmWave module, second RF signals for sensing an object, in response to transmitting the second RF signals, identifying third RF signals received through the at least one mm Wave module, and based on the third RF signals, identifying information related to the object.

* * * * *